United States Patent
Yerramalli et al.

(10) Patent No.: US 10,616,865 B2
(45) Date of Patent: Apr. 7, 2020

(54) TECHNIQUES FOR REPORTING RADIO RESOURCE MANAGEMENT (RRM) MEASUREMENTS FOR A SHARED RADIO FREQUENCY SPECTRUM BAND

(71) Applicant: QUALCOMM Incorporated, San Diego, CA (US)

(72) Inventors: Srinivas Yerramalli, San Diego, CA (US); Tao Luo, San Diego, CA (US); Madhavan Srinivasan Vajapeyam, San Diego, CA (US); Peter Gaal, San Diego, CA (US); Amir Aminzadeh Gohari, Sunnyvale, CA (US); Valentin Alexandru Gheorghiu, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 15/234,917

(22) Filed: Aug. 11, 2016

(65) Prior Publication Data

US 2017/0048824 A1 Feb. 16, 2017

Related U.S. Application Data

(60) Provisional application No. 62/205,534, filed on Aug. 14, 2015.

(51) Int. Cl.
*H04W 72/04* (2009.01)
*H04L 5/00* (2006.01)
(Continued)

(52) U.S. Cl.
CPC ........... *H04W 72/04* (2013.01); *H04L 5/0007* (2013.01); *H04W 24/10* (2013.01); *H04W 76/20* (2018.02); *H04W 88/06* (2013.01); *H04W 88/08* (2013.01)

(58) Field of Classification Search
CPC ..... H04W 72/04; H04W 24/10; H04W 76/20; H04W 88/06; H04W 88/08; H04L 5/0007
See application file for complete search history.

(56) References Cited

U.S. PATENT DOCUMENTS

| | | | |
|---|---|---|---|
| 2003/0083069 A1* | 5/2003 | Vadgama | H04W 36/22 455/436 |
| 2004/0203717 A1* | 10/2004 | Wingrowicz | H04W 24/00 455/423 |

(Continued)

FOREIGN PATENT DOCUMENTS

WO WO-2011130452 A2 10/2011

OTHER PUBLICATIONS

Catt et al., "TP to 36.805: RRC Connection Re-Establishment and Cell Update After Radio Link Failure," 3GPP TSG-RAN WG2 Meeting #67, R2-09xxxx (R2-095235), Shenzhen, China, Aug. 24-28, 2009, 7 pgs., XP050389753, 3rd Generation Partnership Project.

(Continued)

*Primary Examiner* — Gregory B Sefcheck
*Assistant Examiner* — Joshua Smith
(74) *Attorney, Agent, or Firm* — Liem T. Do

(57) ABSTRACT

Techniques are described for wireless communication. One method includes performing a plurality of radio resource management (RRM) measurements for a number of active downlink carriers in a shared radio frequency spectrum band; associating each of the RRM measurements with a measurement time indication; and transmitting data corresponding to the RRM measurements and the measurement time indications to a base station. Another method includes receiving an indication of co-located downlink carriers in a shared radio frequency spectrum band; performing a plurality of RRM measurements for the downlink carriers; combining the RRM measurements over a time interval in the (Continued)

shared radio frequency spectrum band based at least in part on the received indication; and transmitting a report based at least in part on the combined RRM measurements to a base station.

24 Claims, 23 Drawing Sheets

(51) Int. Cl.
  *H04W 24/10* (2009.01)
  *H04W 76/20* (2018.01)
  *H04W 88/08* (2009.01)
  *H04W 88/06* (2009.01)

(56) References Cited

U.S. PATENT DOCUMENTS

| | | | |
|---|---|---|---|
| 2007/0026810 A1* | 2/2007 | Love | H04W 24/10 455/67.11 |
| 2010/0103906 A1* | 4/2010 | Montojo | H04J 11/0069 370/335 |
| 2010/0202431 A1* | 8/2010 | Kazmi | H04B 7/0426 370/342 |
| 2011/0009116 A1 | 1/2011 | Moberg et al. | |
| 2012/0083263 A1 | 4/2012 | Kim et al. | |
| 2012/0213153 A1* | 8/2012 | Faurie | H04L 1/0026 370/328 |
| 2013/0235738 A1* | 9/2013 | Siomina | H04W 24/00 370/252 |
| 2013/0336302 A1* | 12/2013 | Lee | H04W 72/0406 370/336 |
| 2014/0056243 A1* | 2/2014 | Pelletier | H04W 74/04 370/329 |
| 2014/0220963 A1* | 8/2014 | Jung | H04W 24/10 455/422.1 |
| 2014/0362717 A1* | 12/2014 | Koskinen | H04W 24/02 370/252 |
| 2015/0181492 A1 | 6/2015 | Schmidt et al. | |
| 2015/0230112 A1 | 8/2015 | Siomina et al. | |
| 2016/0043841 A1* | 2/2016 | Lunttila | H04L 5/0092 370/280 |
| 2016/0080959 A1* | 3/2016 | Kim | H04W 24/10 455/67.11 |
| 2016/0119846 A1* | 4/2016 | Chou | H04W 36/22 370/331 |
| 2016/0227519 A1* | 8/2016 | Nimbalker | H04L 5/0094 |
| 2017/0339693 A1* | 11/2017 | Cierny | H04W 16/14 |

OTHER PUBLICATIONS

ISA/EP, International Search Report and Written Opinion of the International Searching Authority, Int'l Application No. PCT/US2016/046863, dated Jan. 17, 2017, European Patent Office, Rijswijk, NL, 18 pgs.

ZTE, "Considerations on Measurements for LAA," 3GPP TSG RAN WG1 Ad-Hoc Meeting, R1-151022, Paris, France, Mar. 24-26, 2015, 6 pgs., XP050951396, 3rd Generation Partnership Project.

* cited by examiner

TECHNIQUES FOR REPORTING RADIO RESOURCE MANAGEMENT (RRM) MEASUREMENTS FOR A SHARED RADIO FREQUENCY SPECTRUM BAND

CROSS REFERENCES

The present application for patent claims priority to U.S. Provisional Patent Application No. 62/205,534 by Yerramalli, et al., entitled "Techniques For Reporting Radio Resource Management (RRM) Measurements For A Shared Radio Frequency Spectrum Band," filed Aug. 14, 2015, assigned to the assignee hereof.

BACKGROUND

Field of the Disclosure

The present disclosure, for example, relates to wireless communication systems, and more particularly to techniques for reporting radio resource management (RRM) measurements for a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communication between a base station and a UE in a shared radio frequency spectrum band, or in different radio frequency spectrum bands (e.g., in a dedicated radio frequency spectrum band and a shared radio frequency spectrum band) of a cellular network. However, in contrast to a dedicated radio frequency spectrum band, which may be allocated for use by the devices of one public land mobile network (PLMN) and be available to a base station of the PLMN at predetermined (or all) times, a shared radio frequency spectrum band may be available for use by the devices of a PLMN intermittently. This intermittent availability may be a result of contention for access to the shared radio frequency spectrum band by devices of the PLMN, by devices of one or more other PLMNs, and/or by other devices (e.g., Wi-Fi devices).

SUMMARY

The present disclosure, for example, relates to wireless communication systems, and more particularly to techniques for reporting RRM measurements for a shared radio frequency spectrum band. When a UE performs RRM measurements for a downlink carrier in a shared radio frequency spectrum band, the UE may perform the RRM measurements at irregular intervals and/or acquire valid RRM measurements at irregular intervals. The performance or acquisition of RRM measurements at irregular intervals may be due to a base station winning contention for access to the downlink carrier for some radio frames or transmission bursts, but not other radio frames or transmission bursts. In addition to performing or acquiring RRM measurements at irregular intervals, the reference signals measured by the UE when performing RRM measurements may be associated with varying transmit powers. The varying transmit powers may be a result of the base station winning contention for access to different numbers of downlink carriers for different radio frames or transmission bursts, and dividing a fixed total transmit power among the downlink carriers for which the base station wins contention for access (e.g., the fixed total transmit power may be allocated to a single downlink carrier in a first radio frame, but divided among three downlink carriers in a second radio frame). The techniques described in the present disclosure can mitigate the effects of irregularly performed or acquired RRM measurements and/or reference signals associated with varying transmit powers by, for example, associating RRM measurements with measurement time indications, combining RRM measurements when the RRM measurements are performed for co-located downlink carriers identified by a base station, or indicating to a base station a reliability or change in reliability of RRM measurements.

In one example, a method for wireless communication at a UE is described. The method may include performing a plurality of radio resource management (RRM) measurements for a number of active downlink carriers in a shared radio frequency spectrum band; associating each of the RRM measurements with a measurement time indication; and transmitting data corresponding to the RRM measurements and the measurement time indications to a base station.

In some examples, the method may include associating each of the RRM measurements with a carrier indication, and transmitting to the base station, with the data corresponding to the RRM measurements and the measurement time indications, the carrier indications. In some examples, associating each of the RRM measurements with a measurement time indication may include associating at least one of the RRM measurements with a subframe number corresponding to a subframe in which the RRM measurement is performed. In some examples, associating each of the RRM measurements with a measurement time indication may include associating the RRM measurement with a measurement order. In some examples, the RRM measurements may be performed and associated with the measurement time indications at a physical layer of a protocol stack, where the data corresponding to the RRM measurements and the measurement time indications includes unfiltered and non-averaged values transmitted from the physical layer to the base station. In some examples, transmitting the data corresponding to the RRM measurements and the measurement time indications may include reporting the data corresponding to the RRM measurements and the measurement time indications from the physical layer to a layer of the protocol stack higher than the physical layer, and reporting the data corresponding to the RRM measurements and the measurement time indications from the layer of the protocol stack higher than the physical layer to the base station. In some examples, performing the plurality of RRM measurements may include measuring a plurality of reference signals received on the number of active downlink carriers, where the plurality of reference signals are associated with variable transmit powers across a plurality of time intervals.

In one example, an apparatus for wireless communication at a UE is described. The apparatus may include means for performing a plurality of RRM measurements for a number of active downlink carriers in a shared radio frequency spectrum band; means for associating each of the RRM measurements with a measurement time indication; and means for transmitting data corresponding to the RRM measurements and the measurement time indications to a base station.

In some examples, the apparatus may include means for associating each of the RRM measurements with a carrier indication, and means for transmitting to the base station, with the data corresponding to the RRM measurements and the measurement time indications, the carrier indications. In some examples, the means for associating each of the RRM measurements with a measurement time indication may include means for associating at least one of the RRM measurements with a subframe number corresponding to a subframe in which the RRM measurement is performed. In some examples, the means for associating each of the RRM measurements with a measurement time indication may include means for associating the RRM measurement with a measurement order. In some examples, the RRM measurements may be performed and associated with the measurement time indications at a physical layer of a protocol stack, where the data corresponding to the RRM measurements and the measurement time indications includes unfiltered and non-averaged values transmitted from the physical layer to the base station. In some examples, the means for transmitting the data corresponding to the RRM measurements and the measurement time indications may include means for reporting the data corresponding to the RRM measurements and the measurement time indications from the physical layer to a layer of the protocol stack higher than the physical layer, and means for reporting the data corresponding to the RRM measurements and the measurement time indications from the layer of the protocol stack higher than the physical layer to the base station. In some examples, the means for performing the plurality of RRM measurements may include means for measuring a plurality of reference signals received on the number of active downlink carriers, where the plurality of reference signals is associated with variable transmit powers across a plurality of time intervals.

In one example, another apparatus for wireless communication at a UE is described. The apparatus may include a processor, and memory coupled to the processor. The processor may be configured to perform a plurality of RRM measurements for a number of active downlink carriers in a shared radio frequency spectrum band; associate each of the RRM measurements with a measurement time indication; and transmit data corresponding to the RRM measurements and the measurement time indications to a base station.

In some examples of the apparatus, the processor may be configured to associate each of the RRM measurements with a carrier indication, and transmit to the base station, with the data corresponding to the RRM measurements and the measurement time indications, the carrier indications. In some examples, associating each of the RRM measurements with a measurement time indication may include associating at least one of the RRM measurements with a subframe number corresponding to a subframe in which the RRM measurement is performed. In some examples, associating each of the RRM measurements with a measurement time indication may include associating the RRM measurement with a measurement order. In some examples, performing the plurality of RRM measurements may include measuring a plurality of reference signals received on the number of active downlink carriers, where the plurality of reference signals is associated with variable transmit powers across a plurality of time intervals.

In one example, a computer-readable medium for storing instructions executable by a processor is described. The computer-readable medium may include instructions to perform a plurality of RRM measurements for a number of active downlink carriers in a shared radio frequency spectrum band; instructions to associate each of the RRM measurements with a measurement time indication; and instructions to transmit data corresponding to the RRM measurements and the measurement time indications to a base station.

In one example, another method for wireless communication at a UE is described. The method may include receiving an indication of co-located downlink carriers in a shared radio frequency spectrum band; performing a plurality of RRM measurements for the downlink carriers; combining the RRM measurements over a time interval in the shared radio frequency spectrum band based at least in part on the received indication; and transmitting a report based at least in part on the combined RRM measurements to a base station.

In some examples of the method, the combining may include at least one of summing or averaging. In some examples, the method may include performing radio resource management based at least in part on the combined RRM measurements. In some examples, performing the radio resource management may include at least one of determining whether to remain associated with the base station, or identifying a candidate base station for association or handover. In some examples, the method may include averaging the combined RRM measurements across a plurality of time intervals, and the report may include an average of the combined RRM measurements. In some examples, performing the plurality of RRM measurements may include measuring a number of reference signals received on the downlink carriers, and the number of reference signals may be associated with a fixed total transmit power across a plurality of time intervals. In some examples, the RRM measurements may include at least one of: reference signal receive power (RSRP) measurements, reference signal received quality (RSRQ) measurements, reference signal strength indicator (RSSI) measurements, or a combination thereof.

In one example, another apparatus for wireless communication at a UE may include means for receiving an indication of co-located downlink carriers in a shared radio frequency spectrum band; means for performing a plurality of RRM measurements for the downlink carriers; means for combining the RRM measurements over a time interval in the shared radio frequency spectrum band based at least in part on the received indication; and means for transmitting a report based at least in part on the combined RRM measurements to a base station.

In some examples, the means for combining may include at least one of means for summing or means for averaging. In some examples, the method may include means for performing radio resource management based at least in part on the combined RRM measurements. In some examples, the means for performing the radio resource management may include at least one of means for determining whether to remain associated with the base station, or means for identifying a candidate base station for association or handover. In some examples, the method may include means for averaging the combined RRM measurements across a plurality of time intervals, and the report may include an average of the combined RRM measurements. In some examples, the means for performing the plurality of RRM measurements may include means for measuring a number of reference signals received on the downlink carriers, and the number of reference signals may be associated with a fixed total transmit power across a plurality of time intervals. In some examples, the RRM measurements may include at least one of RSRP measurements, RSRQ measurements, RSSI measurements, or a combination thereof.

In one example, another apparatus for wireless communication at a UE may include a processor, and memory coupled to the processor. The processor may be configured to receive an indication of co-located downlink carriers in a shared radio frequency spectrum band; to perform a plurality of RRM measurements for the downlink carriers; to combine the RRM measurements over a time interval in the shared radio frequency spectrum band based at least in part on the received indication; and to transmit a report based at least in part on the combined RRM measurements to a base station.

In some examples of the apparatus, the combining may include at least one of summing or averaging. In some examples, the processor may be configured to perform radio resource management based at least in part on the combined RRM measurements. In some examples, performing the plurality of RRM measurements may include measuring a number of reference signals received on the downlink carriers, the number of reference signals associated with a fixed total transmit power across a plurality of time intervals. In some examples, the RRM measurements may include at least one of RSRP measurements, RSRQ measurements, RSSI measurements, or a combination thereof.

In one example, another computer-readable medium for storing instructions executable by a processor is described. The computer-readable medium may include instructions to receive an indication of co-located downlink carriers in a shared radio frequency spectrum band; instructions to perform a plurality of RRM measurements for the downlink carriers; instructions to combine the RRM measurements over a time interval in the shared radio frequency spectrum band based at least in part on the received indication; and instructions to transmit a report based at least in part on the combined RRM measurements to a base station.

In one example, another method for wireless communication at a UE is described. The method may include performing a plurality of RRM measurements for a downlink carrier in a shared radio frequency spectrum band; determining a reliability of the RRM measurements; and transmitting data corresponding to the RRM measurements and an indication of the reliability of the RRM measurements to a base station.

In some examples, determining the reliability of the RRM measurements may include identifying an elapsed time without performing a valid RRM measurement. In some examples, determining the reliability of the RRM measurements may include counting a number of the RRM measurements performed during a period of time.

In one example, another apparatus for wireless communication at a UE is described. The apparatus may include means for performing a plurality of RRM measurements for a downlink carrier in a shared radio frequency spectrum band; means for determining a reliability of the RRM measurements; and means for transmitting data corresponding to the RRM measurements and an indication of the reliability of the RRM measurements to a base station.

In some examples, the means for determining the reliability of the RRM measurements may include means for identifying an elapsed time without performing a valid RRM measurement. In some examples, the means for determining the reliability of the RRM measurements may include means for counting a number of the RRM measurements performed during a period of time.

In one example, another apparatus for wireless communication at a UE is described. The apparatus may include a processor, and memory coupled to the processor. The processor may be configured to perform a plurality of RRM measurements for a downlink carrier in a shared radio frequency spectrum band; to determine a reliability of the RRM measurements; and to transmit data corresponding to the RRM measurements and an indication of the reliability of the RRM measurements to a base station.

In some examples, determining the reliability of the RRM measurements may include identifying an elapsed time without performing a valid RRM measurement. In some examples, determining the reliability of the RRM measurements may include counting a number of the RRM measurements performed during a period of time.

In one example, another computer-readable medium for storing instructions executable by a processor is described. The computer-readable medium may include instructions to perform a plurality of RRM measurements for a downlink carrier in a shared radio frequency spectrum band; instructions to determine a reliability of the RRM measurements; and instructions to transmit data corresponding to the RRM measurements and an indication of the reliability of the RRM measurements to a base station.

In one example, another method for wireless communication at a UE is described. The method may include performing a plurality of RRM measurements for a downlink carrier in a shared radio frequency spectrum band; identifying a change in a reliability of the RRM measurements; and performing, in response to identifying the change in the reliability, at least one of resetting a RRM measurement filter for a cell corresponding to the downlink carrier, triggering a transmittal of a measurement report to a base station, withholding a transmittal of data corresponding to the RRM measurements to the base station, identifying the cell corresponding to the downlink carrier as non-detectable, or a combination thereof.

In one example, another apparatus for wireless communication at a UE is described. The apparatus may include means for performing a plurality of RRM measurements for a downlink carrier in a shared radio frequency spectrum band; means for identifying a change in a reliability of the RRM measurements; and means for performing, in response to identifying the change in the reliability, at least one of resetting a RRM measurement filter for a cell corresponding to the downlink carrier, triggering a transmittal of a measurement report to a base station, withholding a transmittal of data corresponding to the RRM measurements to the base station, identifying the cell corresponding to the downlink carrier as non-detectable, or a combination thereof.

In one example, another apparatus for wireless communication at a UE is described. The apparatus may include a processor, and memory coupled to the processor. The processor may be configured to perform a plurality of RRM measurements for a downlink carrier in a shared radio frequency spectrum band; to identify a change in a reliability of the RRM measurements; and to perform, in response to identifying the change in the reliability, at least one of resetting a RRM measurement filter for a cell corresponding to the downlink carrier, triggering a transmittal of a measurement report to a base station, withholding a transmittal of data corresponding to the RRM measurements to the base station, identifying the cell corresponding to the downlink carrier as non-detectable, or a combination thereof.

In one example, another computer-readable medium for storing instructions executable by a processor is described. The computer-readable medium may include instructions to perform a plurality of RRM measurements for a downlink carrier in a shared radio frequency spectrum band; instructions to identify a change in a reliability of the RRM measurements; and instructions to perform, in response to identifying the change in the reliability, at least one of resetting a RRM measurement filter for a cell corresponding to the downlink carrier, triggering a transmittal of a measurement report to a base station, withholding a transmittal of data corresponding to the RRM measurements to the base station, identifying the cell corresponding to the downlink carrier as non-detectable, or a combination thereof.

In one example, a method for wireless communication at a base station is described. The method may include recording transmission power indications and transmission time indications for a plurality of reference signals transmitted to a UE; receiving, from the UE, data corresponding to a plurality of RRM measurements and measurement time indications associated with the RRM measurements, where the RRM measurements are based at least in part on the reference signals; correlating the transmission power indications with the data based at least in part on a correlation between the measurement time indications and the transmission time indications; and adjusting the data based at least in part on the correlating.

In some examples, the method may include identifying, from the correlating, at least one reference signal for which data corresponding to a RRM measurement is not received. In some examples, the method may include identifying, from the correlating, data corresponding to at least one outlier RRM measurement.

In one example, an apparatus for wireless communication at a base station is described. The apparatus may include means for recording transmission power indications and transmission time indications for a plurality of reference signals transmitted to a UE; means for receiving, from the UE, data corresponding to a plurality of RRM measurements and measurement time indications associated with the RRM measurements, where the RRM measurements are based at least in part on the reference signals; means for correlating the transmission power indications with the data based at least in part on a correlation between the measurement time indications and the transmission time indications; and means for adjusting the data based at least in part on the correlating.

In some examples, the apparatus may include means for identifying, from the correlating, at least one reference signal for which data corresponding to a RRM measurement is not received. In some examples, the apparatus may include means for identifying, from the correlating, data corresponding to at least one outlier RRM measurement.

In one example, another apparatus for wireless communication at a base station is described. The apparatus may include a processor, and memory coupled to the processor. The processor may be configured to record transmission power indications and transmission time indications for a plurality of reference signals transmitted to a UE; to receive, from the UE, data corresponding to a plurality of RRM measurements and measurement time indications associated with the RRM measurements, where the RRM measurements are based at least in part on the reference signals; correlate the transmission power indications with the data based at least in part on a correlation between the measurement time indications and the transmission time indications; and adjust the data based at least in part on the correlating.

In one example, a computer-readable medium for storing instructions executable by a processor is described. The computer-readable medium may include instructions to record transmission power indications and transmission time indications for a plurality of reference signals transmitted to a UE; instructions to receive, from the UE, data corresponding to a plurality of RRM measurements and measurement time indications associated with the RRM measurements, where the RRM measurements are based at least in part on the reference signals; instructions to correlate the transmission power indications with the data based at least in part on a correlation between the measurement time indications and the transmission time indications; and instructions to adjust the data based at least in part on the correlating.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
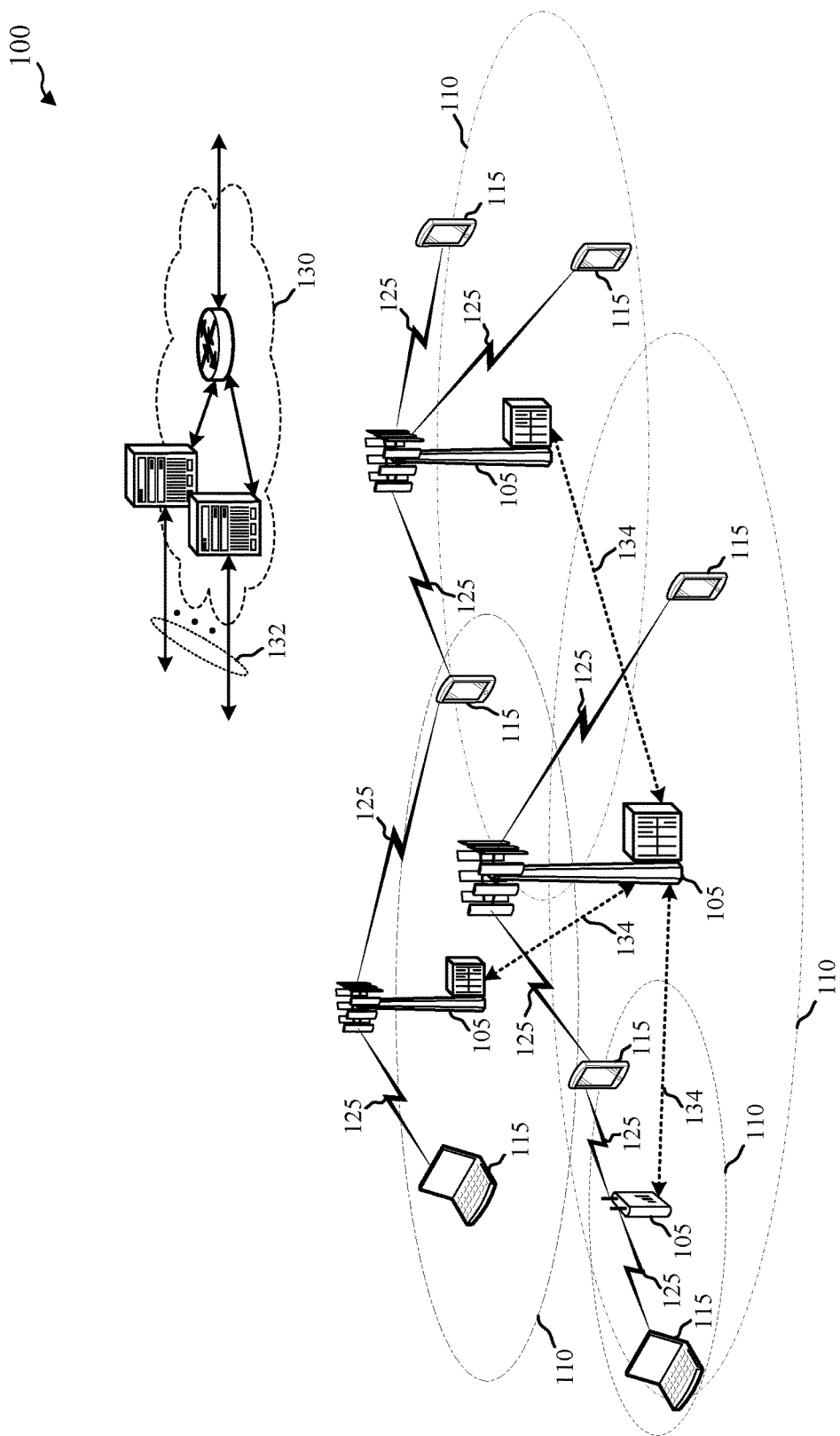
FIG. 1 illustrates an example of a wireless communication system, in accordance with various aspects of the present disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a PLMN or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. Before communicating over a shared radio frequency spectrum band, a transmitting apparatus may perform a Listen-Before-Talk (LBT) procedure to gain access to the shared radio frequency spectrum band. Such an LBT procedure may include performing a clear channel assessment (CCA) procedure (or extended CCA procedure) to determine whether a channel of the shared radio frequency spectrum band is available. When it is determined that the channel of the shared radio frequency spectrum band is available, a channel reservation signal (e.g., a channel usage beacon signal (CUBS)) may be transmitted to reserve the channel. When it is determined that a channel is not available, a CCA procedure (or extended CCA procedure) may be performed for the channel again at a later time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five component carriers (CCs) when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a dedicated radio frequency spectrum band (e.g., a radio frequency spectrum band for which transmitting apparatuses may not contend for access because the radio frequency spectrum band is licensed to particular users for particular uses (e.g., a licensed radio frequency spectrum band usable for LTE/LTE-A communications)) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). Upon winning a contention for access to the shared radio frequency spectrum band, a transmitting apparatus (e.g., a base station 105 or UE 115) may transmit one or more CUBS over the shared radio frequency spectrum band. The CUBS may reserve the shared radio frequency spectrum band by providing a detectable energy on the shared radio frequency spectrum band. The CUBS may also serve to identify the transmitting apparatus or serve to synchronize the transmitting apparatus and a receiving apparatus.

Figure 2:
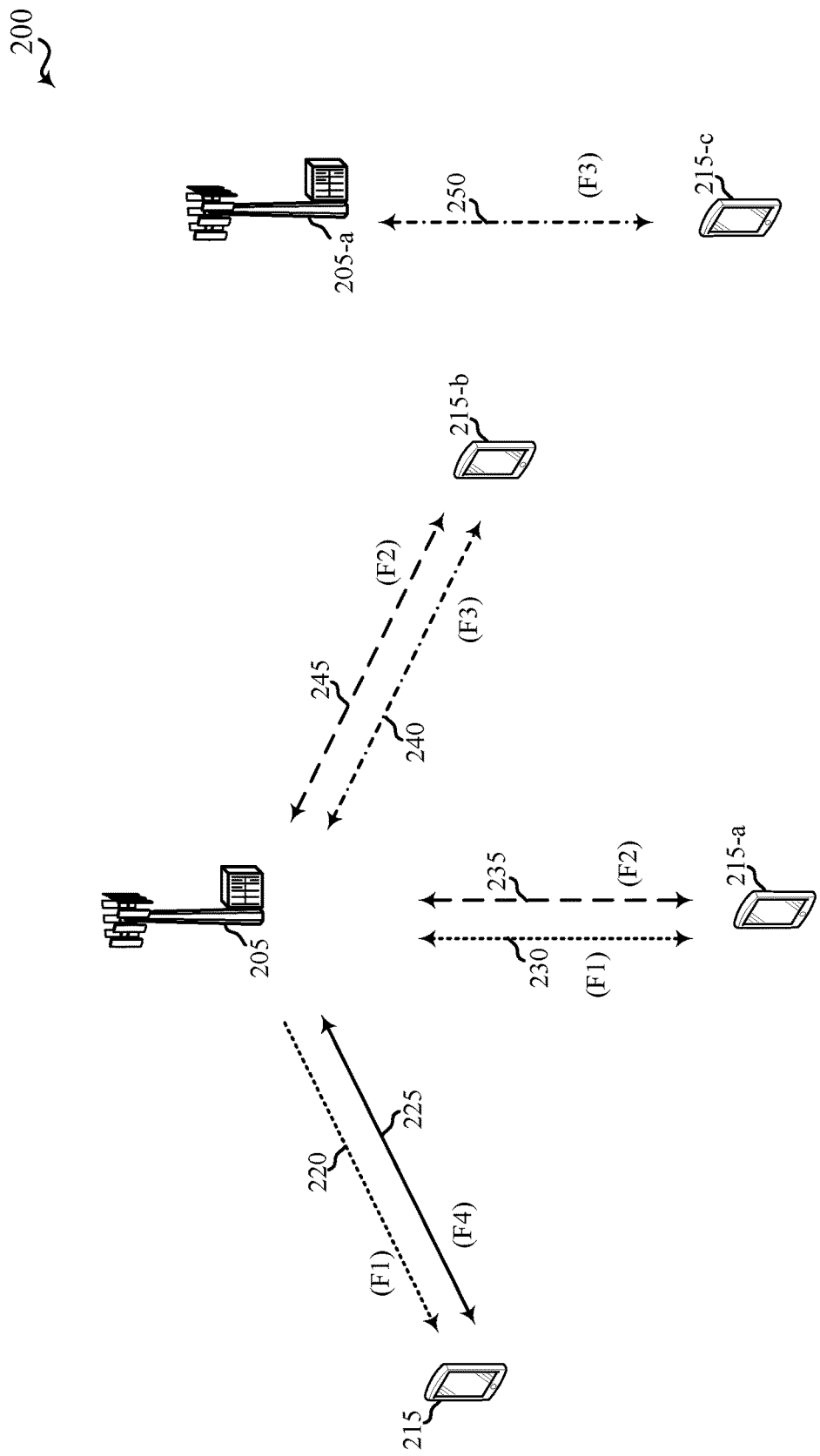
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the shared radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink mode (e.g., licensed assisted access mode) described above, this scenario may occur with any service provider (e.g., MNO) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, or resource block interleaved waveforms from the third UE 215-*b* using the fourth bidirectional link 240. The fourth bidirectional link 240 may be associated with a frequency F3 in the shared radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink, carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD)

carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, or resource block interleaved FDMA waveforms from the fourth UE 215-*c* using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-*a* described with reference to FIG. 1 or 2, or one of the UEs 115, 215, 215-*a*, 215-*b*, or 215-*c* described with reference to FIG. 1 or 2, may use a gating interval to gain access to a channel (or carrier) of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a CCA procedure. The outcome of the CCA procedure may indicate to the transmitting apparatus whether a channel of a shared radio frequency spectrum band is available or in use for the gating interval (e.g., a LBT radio frame or LBT transmission burst). When a CCA procedure indicates that the channel is available for a corresponding LBT radio frame or LBT transmission burst (e.g., "clear" for use), the transmitting apparatus may reserve or use the channel of the shared radio frequency spectrum band during part or all of the LBT radio frame or LBT transmission burst. When the CCA procedure indicates that the channel is not available (e.g., that the channel is in use or reserved by another transmitting apparatus), the transmitting apparatus may be prevented from using the channel during the LBT radio frame or LBT transmission burst.

Figure 3:
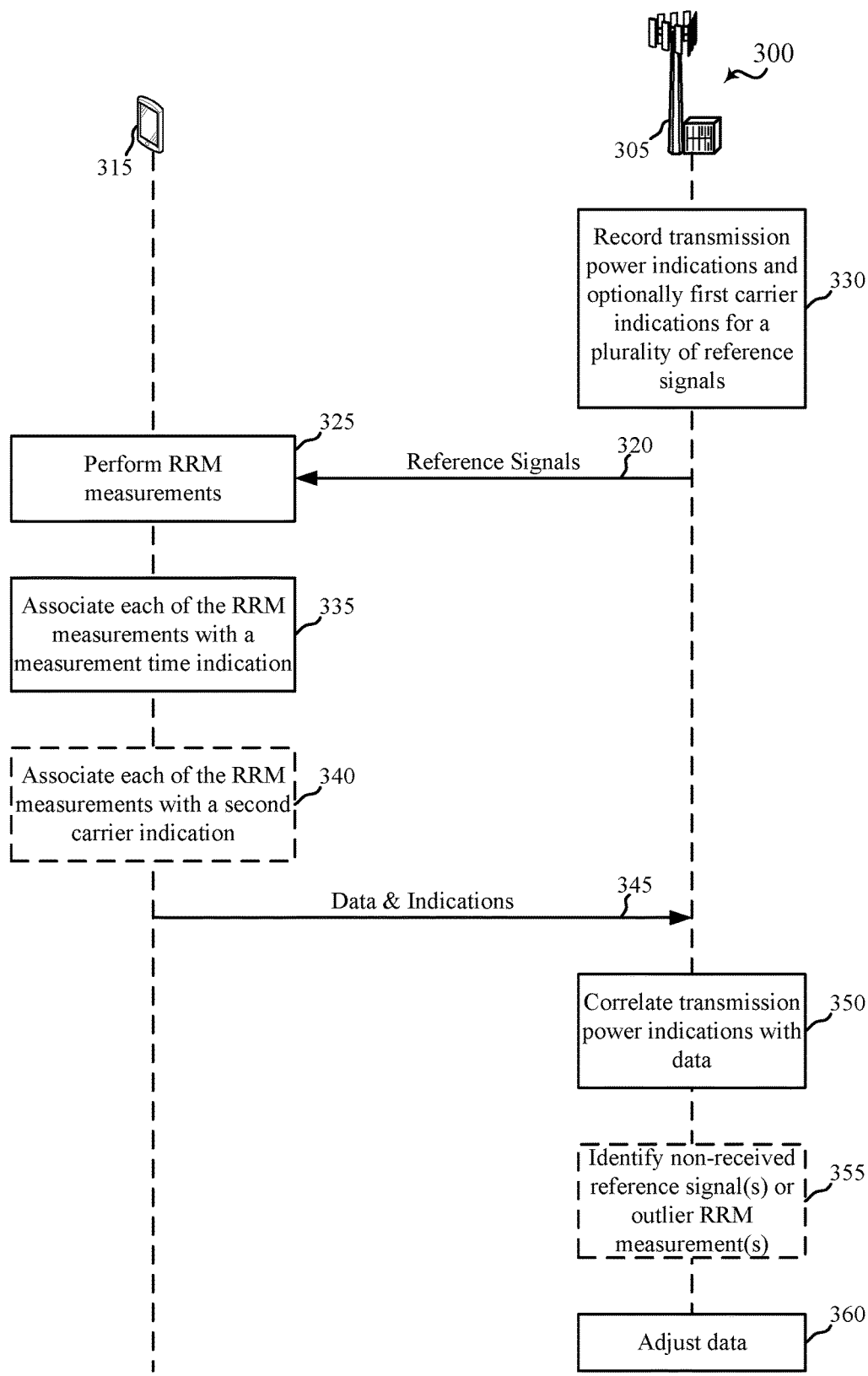
FIG. 3 shows a message flow in which RRM measurements performed by a UE may be associated with measurement time indications and/or carrier indications, in accordance with various aspects of the present disclosure.

FIG. 3 shows a message flow 300 in which RRM measurements performed by a UE may be associated with measurement time indications and/or carrier indications, in accordance with various aspects of the present disclosure. The messages may be transmitted between a base station 305 and a UE 315. The base station 305 may be an example of aspects of the base station 105, 205, or 205-*a* described with reference to FIG. 1 or 2, and the UE 315 may be an example of aspects of the UE 115, 215, 215-*a*, 215-*b*, or 215-*c* described with reference to FIG. 1 or 2.

At 325, the UE 315 may perform a plurality of RRM measurements for a number of active downlink carriers in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). In some examples, the active downlink carriers may include a set of one or more downlink carriers for which contention for access to the shared radio frequency spectrum band has been won. The downlink carriers included in the set of one or more downlink carriers may change from one LBT radio frame or LBT transmission burst to another LBT radio frame or LBT transmission burst, depending on whether contention for access to each of a plurality of downlink carriers is won or lost for a LBT radio frame or LBT transmission burst. In some examples, performing the plurality of RRM measurements may include measuring a plurality of reference signals 320 (e.g., cell-specific reference signals (CRSs) or discovery reference signals (DRSs)) received on the number of active downlink carriers. The plurality of reference signals 320 may be associated with variable transmit powers across a plurality of time intervals. In some examples, the RRM measurements may include at least one of RSRP measurements, RSRQ measurements, RSSI measurements, or a combination thereof.

At 330, the base station 305 may record transmission power indications and transmission time indications for the reference signals 320. In some examples, the base station 305 may further record first carrier indications for the plurality of reference signals 320.

At 335, the UE 315 may associate each of the RRM measurements with a measurement time indication. In some examples, associating each of the RRM measurements with a measurement time indication may include associating at least one of the RRM measurements with a subframe number corresponding to a subframe in which the RRM measurement is performed. In some examples, associating each of the RRM measurements with a measurement time indication may further include associating the RRM measurement with a measurement order. In some examples, each of an RSRP measurement, a RSRQ measurement, and a RSSI measurement (or other measurement components) may be associated with a separate or different measurement time indication.

At 340, the UE 315 may optionally associate each of the RRM measurements with a second carrier indication.

At 345, the UE 315 may transmit data corresponding to the RRM measurements, the measurement time indications, and optionally the second carrier indications to the base station 305.

At 350, the base station 305 may correlate the transmission power indications with the data based at least in part on a correlation between the measurement time indications and the transmission time indications (and optionally, based on a correlation of the second carrier indications with the first carrier indications).

At 355, the base station 305 may optionally identify, from the correlating, at least one reference signal for which data corresponding to a RRM measurement is not received, or identify, from the correlating, data corresponding to at least one outlier RRM measurement.

At 360, the base station 305 may adjust the data corresponding the RRM measurements based at least in part on the correlating performed at 350 (e.g., based on transmit power variations) or the identifications made at 355.

Figure 4:
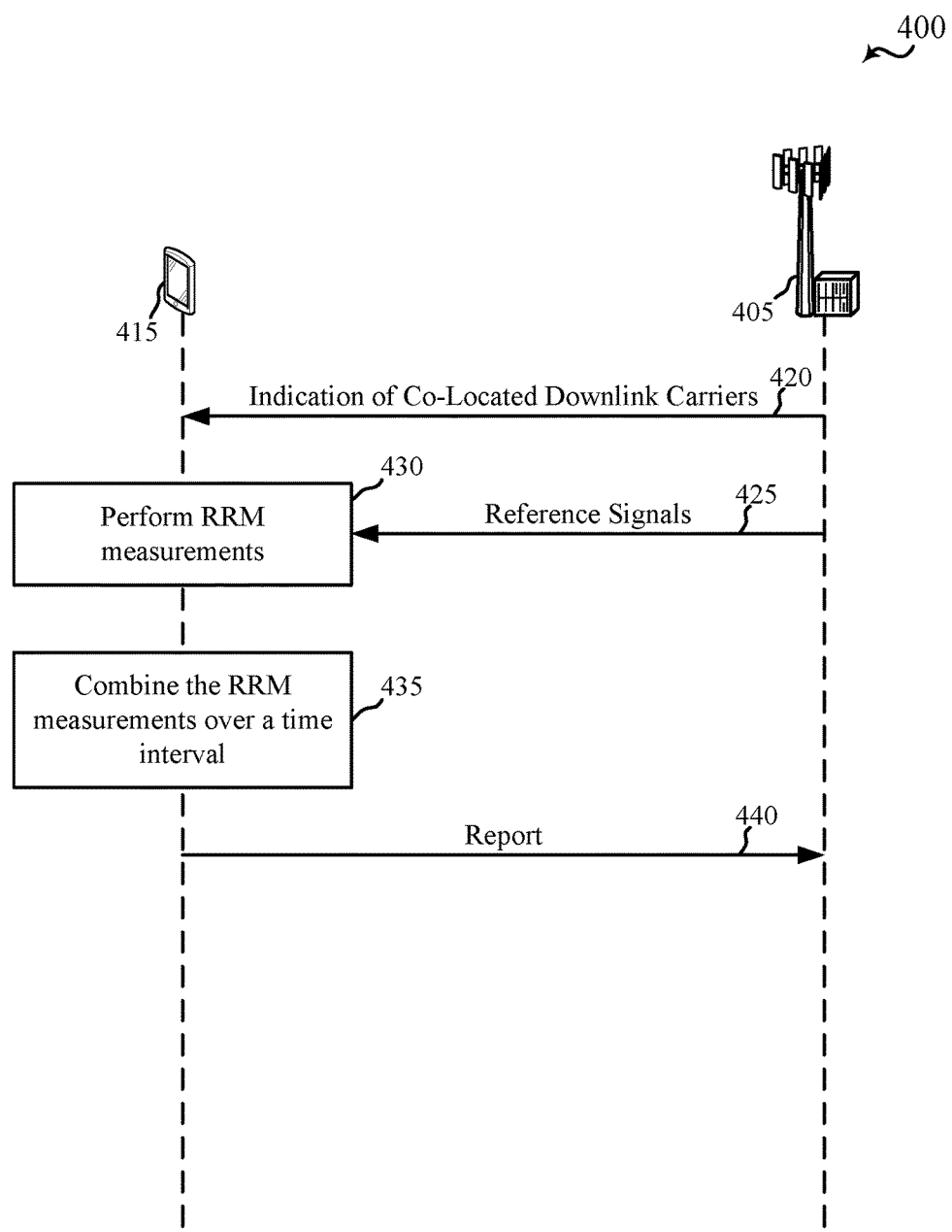
FIG. 4 shows a message flow in which RRM measurements may be performed and combined for co-located downlink carriers in a shared radio frequency spectrum band, in accordance with various aspects of the present disclosure.

The message flow 300 may be useful when the transmit power per downlink carrier can change from one LBT radio frame or LBT transmission burst to another LBT radio frame or LBT transmission burst. In some examples, the transmit power per downlink carrier may change because the number of active downlink carriers changes, and because a fixed total transmit power is divided among the active downlink carriers. The number of active downlink carriers may change from one LBT radio frame or LBT transmission burst to another LBT radio frame or LBT transmission burst as a result of contention for access to each downlink carrier in the shared radio frequency spectrum band being won or lost for each LBT radio frame or LBT transmission burst. In the message flow 300, the UE 315 may refrain from averaging or filtering RRM measurements, and associates the RRM measurements with measurement time indications and/or carrier indications, so that the base station 305 can FIG. 4 shows a message flow 400 in which RRM measurements may be performed and combined for co-located downlink carriers in a shared radio frequency spectrum band, in accordance with various aspects of the present disclosure. The messages may be transmitted between a base station 405 and a UE 415. The base station 405 may be an example of aspects of the base station 105, 205, 205-*a*, or 305 described with reference to FIG. 1, 2, or 3, and the UE 415 may be an example of aspects of the UE 115, 215, 215-*a*, 215-*b*, 215-*c*, or 315 described with reference to FIG. 1, 2, or 3.

At 420, the UE 415 may receive an indication of co-located downlink carriers in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

At 430, the UE 415 may perform a plurality of RRM measurements for the downlink carriers. In some examples, performing the plurality of RRM measurements may include measuring a number of reference signals 425 (e.g., CRSs or DRSs) received on the downlink carriers. The number of reference signals may be associated with a fixed total transmit power across a plurality of time intervals. In some examples, the RRM measurements may include at least one of RSRP measurements, RSRQ measurements, RSSI measurements, or a combination thereof.

At 435, the UE 415 may combine the RRM measurements over a time interval in the shared radio frequency spectrum band based at least in part on the indication received at 420. In some examples (e.g., in the case of RSRP measurements or RSRQ measurements), the combining may include a summing. In some examples (e.g., in the case of RSSI measurements), the combining may include an averaging.

At 440, the UE 415 may transmit a report based at least in part on the combined RRM measurements to the base station 405. At 445, the UE 415 may perform radio resource management based at least in part on the combined RRM measurements.

The message flow 400 enables the base station 405 to dynamically change power for a LBT radio frame or LBT transmission burst without affecting the UE 415, because even though the transmit power of each reference signal may vary across LBT radio frames or LBT transmission bursts, the total transmit power associated with the number of reference signals being measured by the UE 415 remains fixed. The message flow 400 may also enable the UE 415 to remain associated with the base station 405 when the UE 415 is operated near the fringe of the base station's coverage area, even though the UE 415 may be unable to receive transmissions over the co-located downlink carriers when all of the co-located downlink carriers are active. For example, the base station 405 may have a power constraint with respect to the co-located downlink carriers, and may divide an available fixed total transmit power between the active ones of the co-located downlink carriers. When a fewer number of downlink carriers are active, division of the fixed total transmit power among the active ones of the downlink carriers may provide a transmit power per downlink carrier that enables the UE 415 to properly receive and decode transmissions from the base station 405 (e.g., the transmit power per downlink carrier may be greater when the number of active downlink carriers is fewer), but when a greater number of downlink carriers are active, division of the fixed total transmit power may provide a transmit power per downlink carrier that does not enable the UE 415 to properly receive and decode transmissions from the base station 405 (e.g., the transmit power per downlink carrier may be lower when the number of active downlink carriers is greater). However, because the radio resource management of the UE 415 is based at least in part on the fixed total transmit power allocated to the set of co-located downlink carriers, instead of the transmit power per downlink carrier, the UE 415 may remain associated with the base station 405 even when the transmit power per active downlink carrier is lower.

Figure 5:
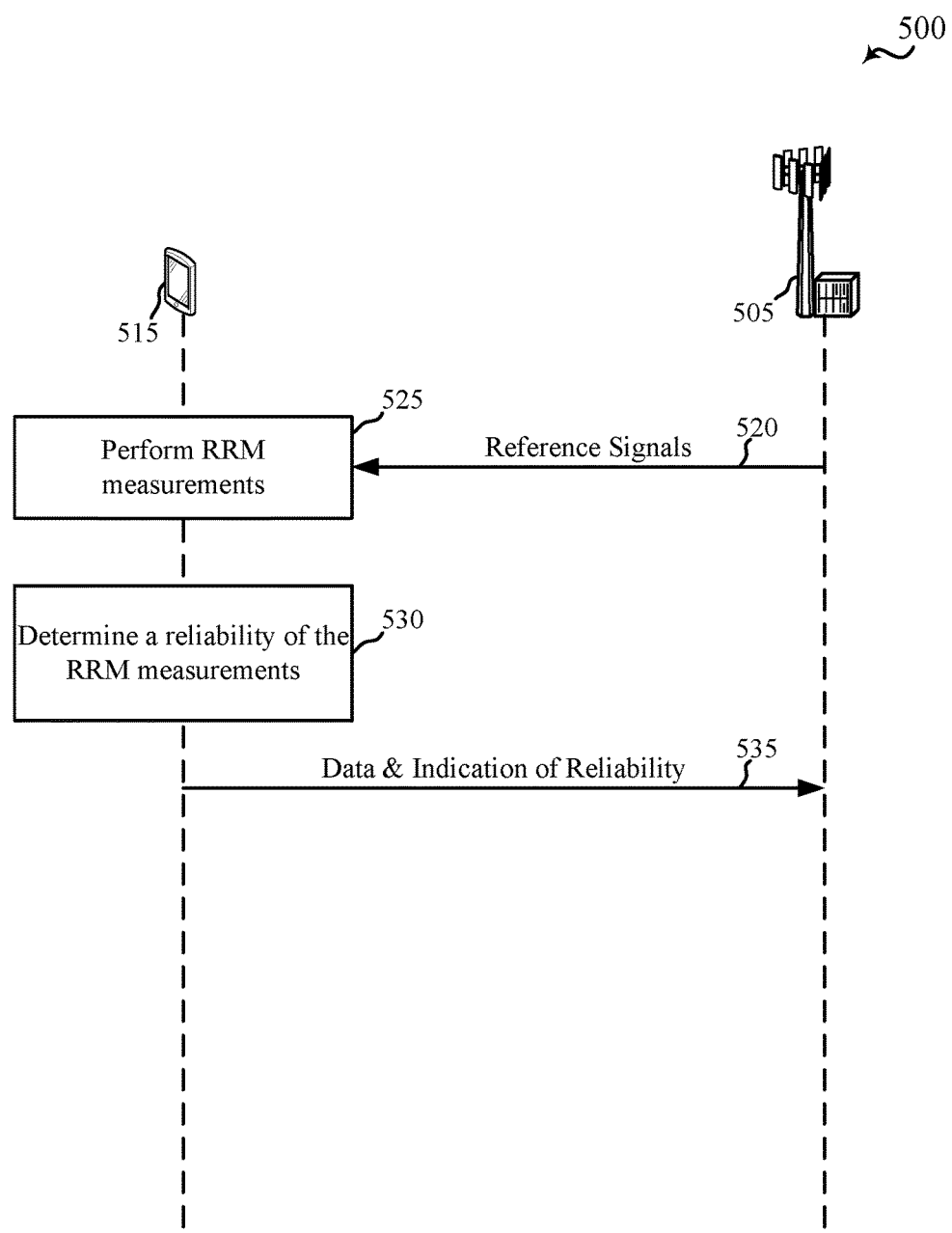
FIG. 5 shows a message flow in which a reliability of RRM measurements may be determined and reported to a base station, in accordance with various aspects of the present disclosure.

FIG. 5 shows a message flow 500 in which a reliability of RRM measurements may be determined and reported to a base station, in accordance with various aspects of the present disclosure. The messages may be transmitted between a base station 505 and a UE 515. The base station 505 may be an example of aspects of the base station 105, 205, 205-*a*, 305, or 405 described with reference to FIG. 1, 2, 3, or 4, and the UE 515 may be an example of aspects of the UE 115, 215, 215-*a*, 215-*b*, 215-*c*, 315, or 415 described with reference to FIG. 1, 2, 3, or 4.

At 525, the UE 515 may perform a plurality of RRM measurements for a downlink carrier in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). In some examples, performing the plurality of RRM measurements may include measuring a plurality of reference signals 520 (e.g., CRSs or DRSs) received on the downlink carrier. The reference signals may be received over a period of time (e.g., over a plurality of subframes or a plurality of LBT radio frames or LBT transmission bursts). In some examples, a RRM measurement may be performed at a physical layer (e.g., a L1 layer) of a protocol stack. In some examples, a RRM measurement may be performed when the downlink carrier is active (e.g., during a LBT radio frame or LBT transmission burst for which contention for access to the shared radio frequency spectrum band has been won), but not when the downlink carrier is inactive (e.g., during a LBT radio frame or LBT transmission burst for which contention for access to the shared radio frequency spectrum band has been lost). In other examples, RRM measurements may be performed during each LBT radio frame of LBT transmission burst, and the UE 615 may refrain from feeding invalid RRM measurements (e.g., RRM measurements performed when the downlink carrier is inactive) from the physical layer to a layer of the protocol stack higher than the physical layer (e.g., a L3 layer). In some examples, the RRM measurements may be filtered at one or more layers of the protocol stack.

At 530, the UE 515 may determine a reliability of the RRM measurements. RRM measurements may become unreliable, for example, when the base station 505 is unable to transmit a reference signal for a number of measurement occasions (e.g., unable to transmit a reference signal for a number of LBT radio frames or LBT transmission bursts), meaning the UE 515 is unable to perform an RRM measurement for a number of LBT radio frames or LBT transmission bursts. In some examples, determining the reliability of the RRM measurements may include identifying an elapsed time without performing a valid RRM measurement. In some examples, determining the reliability of the RRM measurements may include counting a number of the RRM measurements performed during a period of time.

At 535, the UE 515 may transmit data corresponding to the RRM measurements and an indication of the reliability of the RRM measurements to the base station 505.

Figure 6:
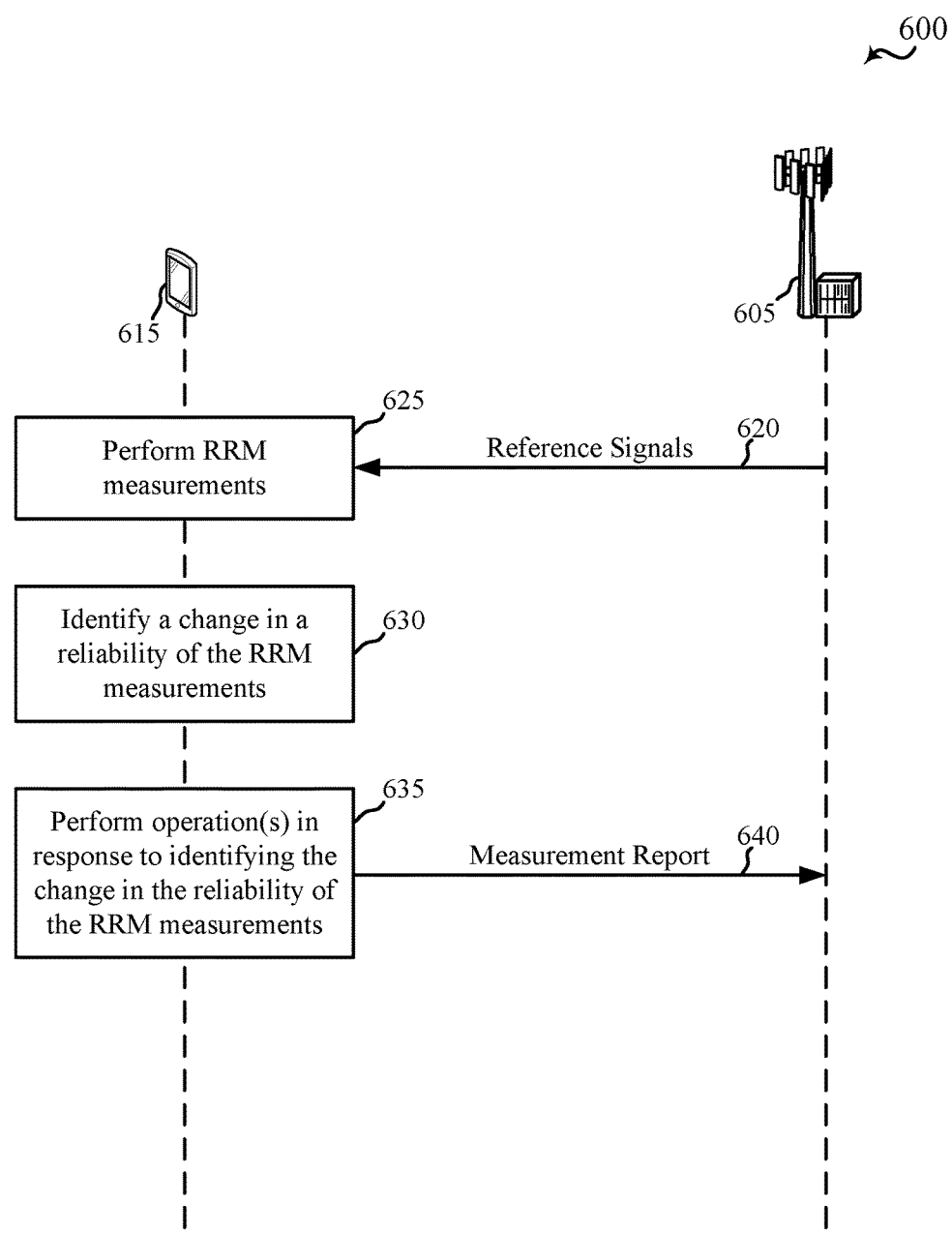
FIG. 6 shows a message flow in which a change in the reliability of RRM measurements may be identified, in accordance with various aspects of the present disclosure.

FIG. 6 shows a message flow 600 in which a change in the reliability of RRM measurements may be identified, in accordance with various aspects of the present disclosure. The messages may be transmitted between a base station 605 and a UE 615. The base station 605 may be an example of aspects of the base station 105, 205, 205-a, 305, 405, or 505 described with reference to FIG. 1, 2, 3, 4, or 5, and the UE 615 may be an example of aspects of the UE 115, 215, 215-a, 215-b, 215-c, 315, 415, or 515 described with reference to FIG. 1, 2, 3, 4, or 5.

At 625, the UE 615 may perform a plurality of RRM measurements for a downlink carrier in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). In some examples, performing the plurality of RRM measurements may include measuring a plurality of reference signals 620 (e.g., CRSs or DRSs) received on the downlink carrier. The reference signals may be received over a period of time (e.g., over a plurality of subframes or a plurality of LBT radio frames or LBT transmission bursts). In some examples, a RRM measurement may be performed at a physical layer (e.g., a L1 layer) of a protocol stack. In some examples, a RRM measurement may be performed when the downlink carrier is active (e.g., during a LBT radio frame or LBT transmission burst for which contention for access to the shared radio frequency spectrum band has been won), but not when the downlink carrier is inactive (e.g., during a LBT radio frame or LBT transmission burst for which contention for access to the shared radio frequency spectrum band has been lost). In other examples, RRM measurements may be performed during each LBT radio frame or LBT transmission burst, and the UE 615 may refrain from feeding invalid RRM measurements (e.g., RRM measurements performed when the downlink carrier is inactive) from the physical layer to a layer of the protocol stack higher than the physical layer (e.g., a L3 layer). In some examples, the RRM measurements may be filtered at one or more layers of the protocol stack.

At 630, the UE 615 may identify a change in a reliability of the RRM measurements. RRM measurements may become unreliable, for example, when the base station 505 is unable to transmit a reference signal for a number of measurement occasions (e.g., unable to transmit a reference signal for a number of LBT radio frames or LBT transmission bursts), meaning the UE 515 is unable to perform an RRM measurement for a number of LBT radio frames or LBT transmission bursts. In some examples identifying a change in the reliability of the RRM measurements may include identifying a change in an elapsed time without performing a valid RRM measurement. In some examples, identifying a change in a reliability of the RRM measurements may include identifying a change in a number of RRM measurements performed during a period of time.

At 635, the UE 615 may perform one of a number of operations in response to identifying the change in the reliability of the RRM measurements. In some examples, the operation(s) may include at least one of: resetting a RRM measurement filter (e.g., a L3 layer filter) for a cell corresponding to the downlink carrier, triggering a transmittal of a measurement report 640 to the base station 605, withholding a transmittal of data corresponding to the RRM measurements to the base station 605, identifying the cell corresponding to the downlink carrier as non-detectable, or a combination thereof.

Figure 7:
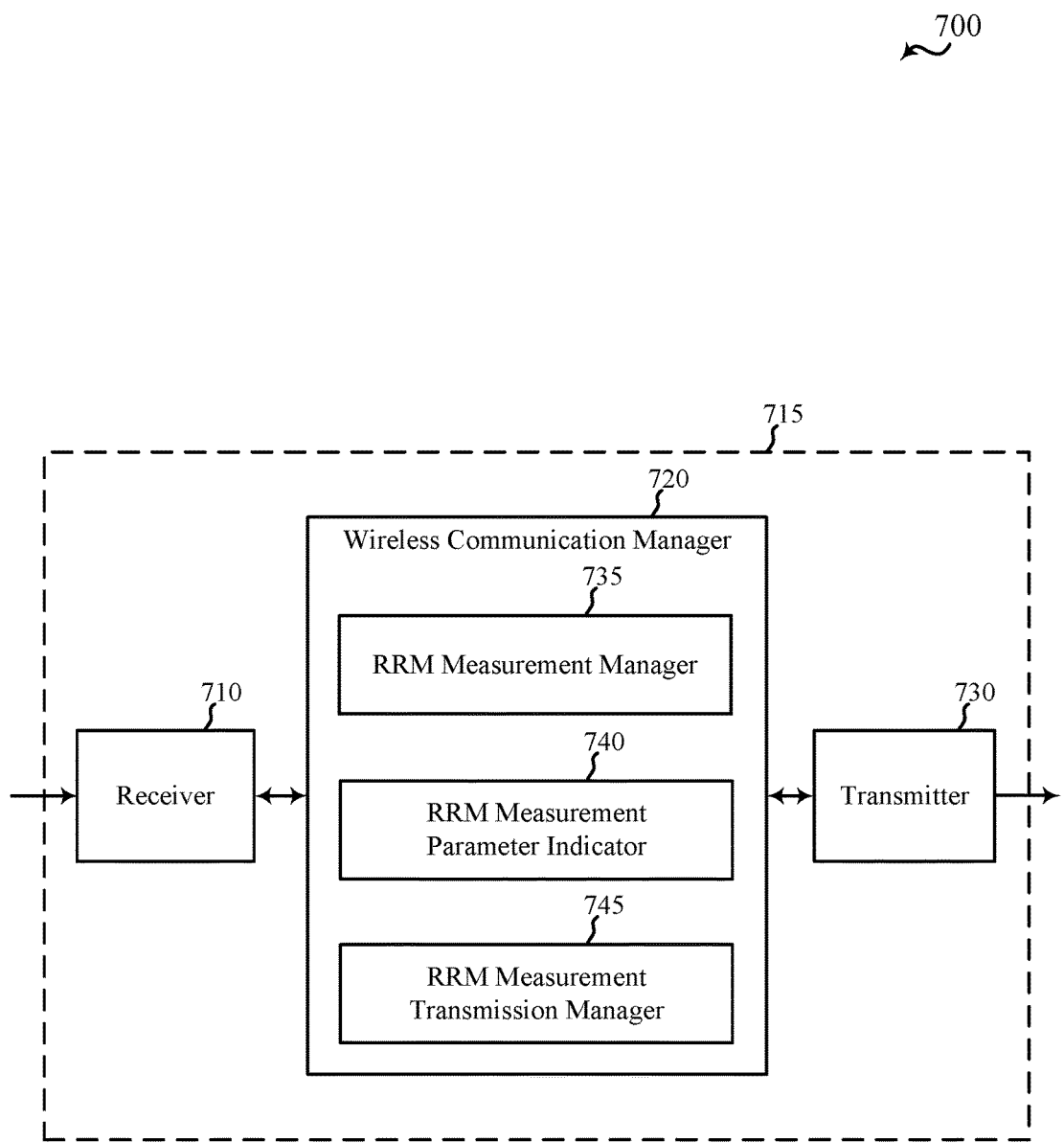
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. The apparatus 715 may be an example of aspects of one or more of the UEs 115, 215, 215-a, 215-b, 215-c, 315, 415, 515, or 615 described with reference to FIG. 1, 2, 3, 4, 5, or 6. The apparatus 715 may also be or include a processor. The apparatus 715 may include a receiver 710, a wireless communication manager 720, or a transmitter 730. Each of these components may be in communication with each other.

The components of the apparatus 715 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one radio frequency (RF) receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, or 6. The receiver 710 may be used to receive various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter 730 may include at least one RF transmitter, such as at least one RF transmitter operable to transmit over the dedicated radio frequency spectrum band or the shared radio frequency spectrum band. The transmitter 730 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 720 may be used to manage one or more aspects of wireless communication for the apparatus 715. In some examples, part of the wireless communication manager 720 may be incorporated into or shared with the receiver 710 or the transmitter 730. In some examples, the wireless communication manager 720 may include a RRM measurement manager 735, a RRM measurement parameter indicator 740, or a RRM measurement transmission manager 745.

The RRM measurement manager 735 may be used to perform a plurality of RRM measurements for a number of active downlink carriers in the shared radio frequency spectrum band. In some examples, the active downlink carriers may include a set of one or more downlink carriers for which contention for access to the shared radio frequency spectrum band has been won. The downlink carriers included in the set of one or more downlink carriers may change from one LBT radio frame or LBT transmission burst to another LBT radio frame or LBT transmission burst, depending on whether contention for access to each of a plurality of downlink carriers is won or lost for a LBT radio frame or LBT transmission burst. In some examples, performing the plurality of RRM measurements may include measuring a plurality of reference signals (e.g., CRSs or DRSs) received on the number of active downlink carriers. The plurality of reference signals may be associated with variable transmit powers across a plurality of time intervals. In some examples, the RRM measurements may include at least one of RSRP measurements, RSRQ measurements, RSSI measurements, or a combination thereof.

The RRM measurement parameter indicator 740 may be used to associate each of the RRM measurements with a measurement time indication. In some examples, associating each of the RRM measurements with a measurement time indication may include associating at least one of the RRM measurements with a subframe number corresponding to a subframe in which the RRM measurement is performed. In some examples, associating each of the RRM measurements with a measurement time indication may further include associating the RRM measurement with a measurement order. In some examples, each of an RSRP measurement, a RSRQ measurement, and a RSSI measurement (or other measurement components) may be associated with a separate or different measurement time indication.

The RRM measurement transmission manager 745 may be used to transmit data corresponding to the RRM measurements and the measurement time indications to a base station.

Figure 8:
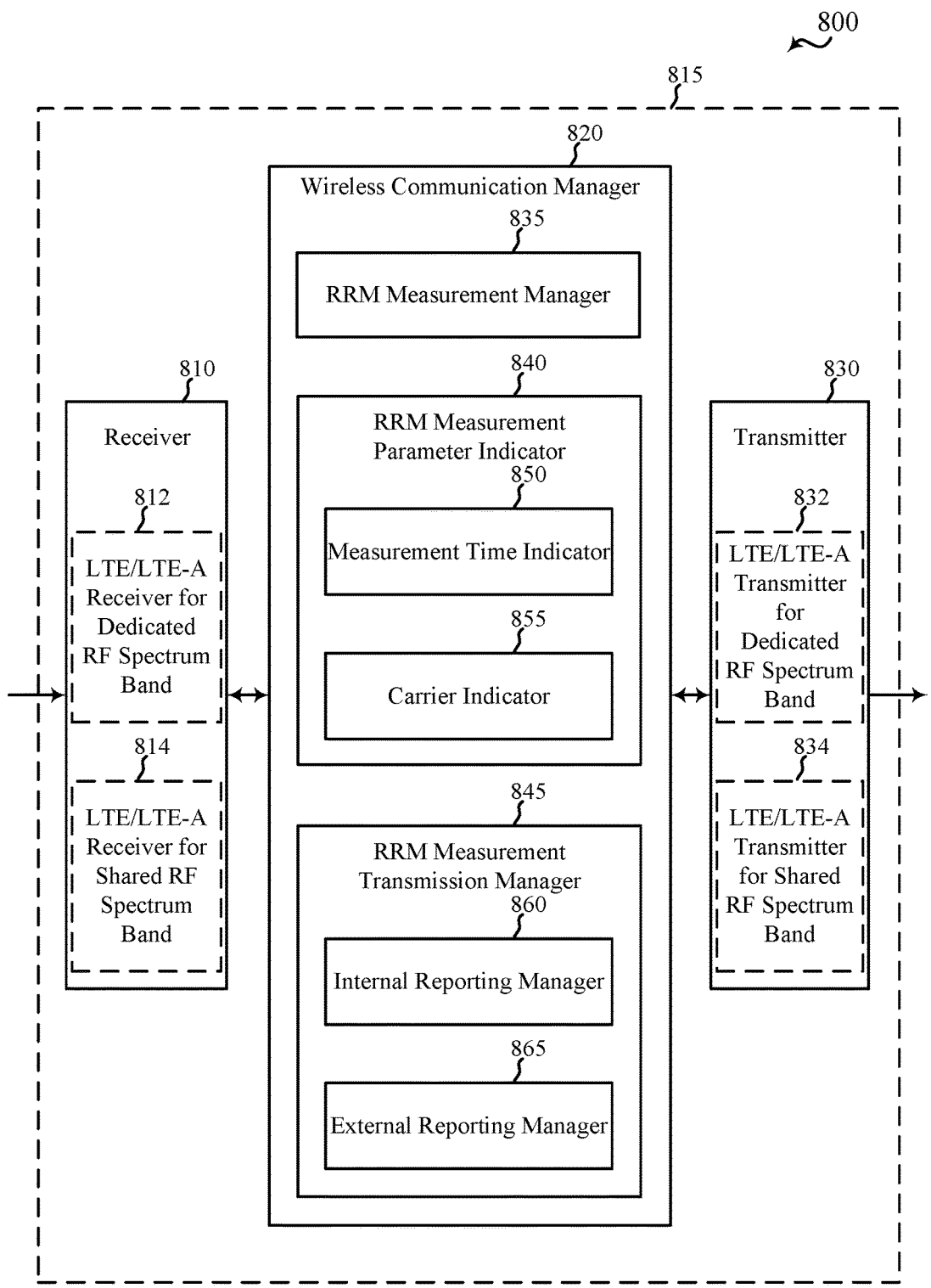
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the UEs 115, 215, 215-a, 215-b, 215-c, 315, 415, 515, or 615 described with reference to FIG. 1, 2, 3, 4, 5, or 6, or aspects of the apparatus 715 described with reference to FIG. 7. The apparatus 815 may also be or include a processor. The apparatus 815 may include a receiver 810, a wireless communication manager 820, or a transmitter 830. Each of these components may be in communication with each other.

The components of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, or 6. The receiver 810 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 812), and an LTE/LTE-A receiver for communicating over the shared radio frequency spectrum band (e.g., LTE/LTE-A receiver for shared RF spectrum band 814). The receiver 810, including the LTE/LTE-A receiver for dedicated RF spectrum band 812 or the LTE/LTE-A receiver for shared RF spectrum band 814, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 830 may include at least one RF transmitter, such as at least one RF transmitter operable to transmit over the dedicated radio frequency spectrum band or the shared radio frequency spectrum band. The transmitter 830 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 832), and an LTE/LTE-A transmitter for communicating over the shared radio frequency spectrum band (e.g., LTE/LTE-A transmitter for shared RF spectrum band 834). The transmitter 830, including the LTE/LTE-A transmitter for dedicated RF spectrum band 832 or the LTE/LTE-A transmitter for shared RF spectrum band 834, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 820 may be used to manage one or more aspects of wireless communication for the apparatus 815. In some examples, part of the wireless communication manager 820 may be incorporated into or shared with the receiver 810 or the transmitter 830. In some examples, the wireless communication manager 820 may include a RRM measurement manager 835, a RRM measurement parameter indicator 840, or a RRM measurement transmission manager 845.

The RRM measurement manager 835 may be used to perform a plurality of RRM measurements for a number of active downlink carriers in the shared radio frequency spectrum band. In some examples, the active downlink carriers may include a set of one or more downlink carriers for which contention for access to the shared radio frequency spectrum band has been won. The downlink carriers included in the set of one or more downlink carriers may change from one LBT radio frame or LBT transmission burst to another LBT radio frame or LBT transmission burst, depending on whether contention for access to each of a plurality of downlink carriers is won or lost for a LBT radio frame or LBT transmission burst. In some examples, performing the plurality of RRM measurements may include measuring a plurality of reference signals (e.g., CRSs or DRSs) received on the number of active downlink carriers. The plurality of reference signals may be associated with variable transmit powers across a plurality of time intervals. In some examples, the RRM measurements may be performed (or the RRM measurement manager 835 may operate) at a physical layer of a protocol stack. In some examples, the RRM measurements may include at least one of RSRP measurements, RSRQ measurements, RSSI measurements, or a combination thereof.

The RRM measurement parameter indicator 840 may include a measurement time indicator 850 or a carrier indicator 855. The measurement time indicator 850 may be used to associate each of the RRM measurements with a measurement time indication. In some examples, associating each of the RRM measurements with a measurement time indication may include associating at least one of the RRM measurements with a subframe number corresponding to a subframe in which the RRM measurement is performed. In some examples, associating each of the RRM measurements with a measurement time indication may further include associating the RRM measurement with a measurement order. The carrier indicator 855 may be used to associate each of the RRM measurements with a carrier indication. In some examples, the RRM measurements may be associated with the measurement time indications or the carrier indications (or the RRM measurement parameter indicator 840 may operate) at the physical layer of the protocol stack. In some examples, each of an RSRP measurement, a RSRQ measurement, and a RSSI measurement (or other measurement components) may be associated with a separate or different measurement time indication.

The RRM measurement transmission manager 845 may be used to transmit data corresponding to the RRM measurements, the measurement time indications, and optionally the carrier indications to a base station. In some examples, the RRM measurement transmission manager 845 may include an internal reporting manager 860 or an external reporting manager 865. The internal reporting manager 860 may be used to report the data corresponding to the RRM measurements, the measurement time indications, and optionally the carrier indications from the physical layer (e.g., a L1 layer) of the protocol stack to a layer of the protocol stack higher than the physical layer (e.g., a L3 layer). The external reporting manager 865 may be used to report the data corresponding to the RRM measurements, the measurement time indications, and optionally the carrier indications from the layer of the protocol stack higher than the physical layer (e.g., the L3 layer) to the base station. In some examples, the data corresponding to the RRM measurements, the measurement time indications, and optionally the carrier indications may include unfiltered and non-averaged values transmitted from the physical layer to the base station (e.g., from the L1 layer to the L3 layer to the base station).

Figure 9:
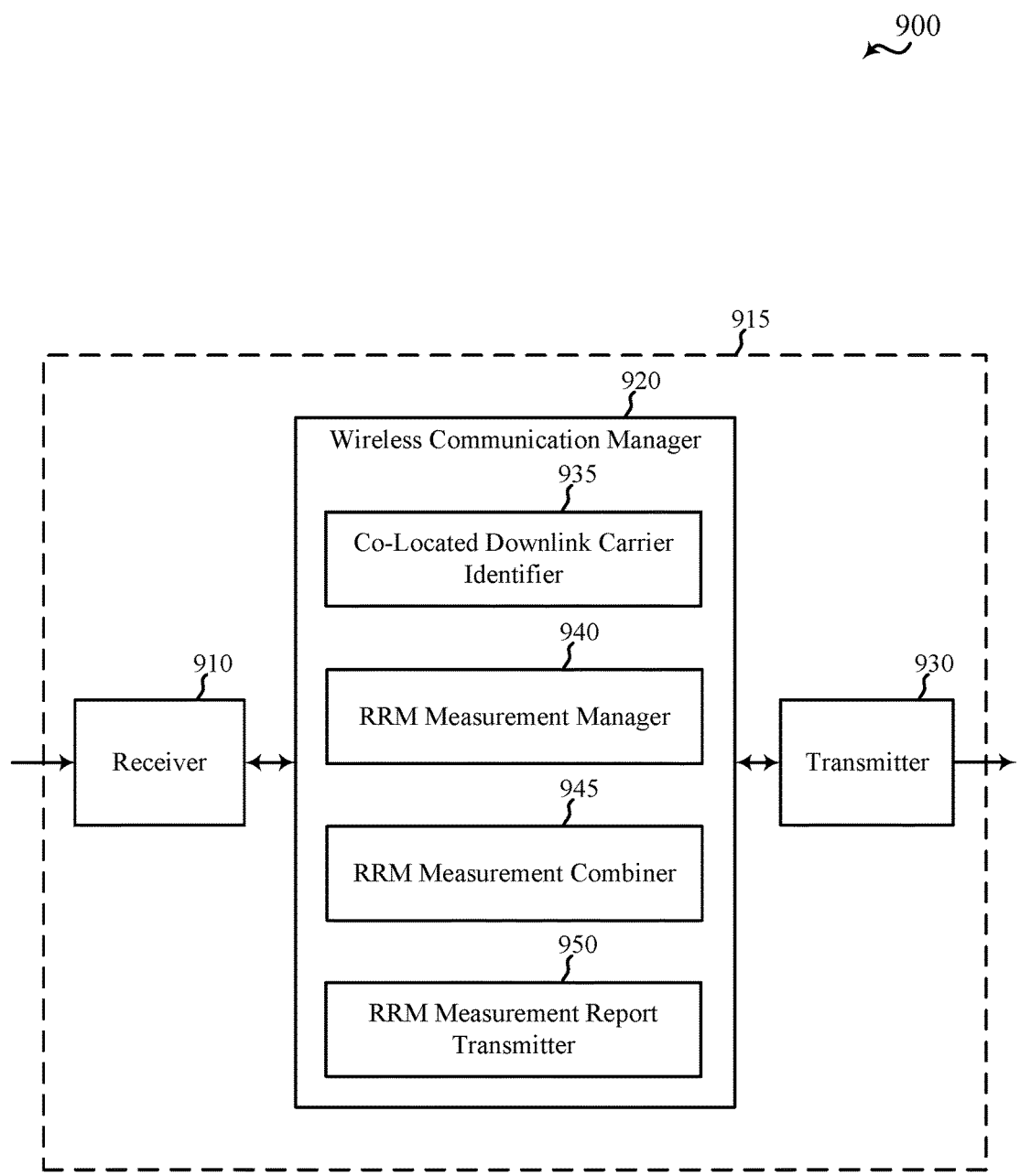
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UEs 115, 215, 215-a, 215-b, 215-c, 315, 415, 515, or 615 described with reference to FIG. 1, 2, 3, 4, 5, or 6. The apparatus 915 may also be or include a processor. The apparatus 915 may include a receiver 910, a wireless communication manager 920, or a transmitter 930. Each of these components may be in communication with each other.

The components of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, or 6. The receiver 910 may be used to receive various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter 930 may include at least one RF transmitter, such as at least one RF transmitter operable to transmit over the dedicated radio frequency spectrum band or the shared radio frequency spectrum band. The transmitter 930 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 920 may be used to manage one or more aspects of wireless communication for the apparatus 915. In some examples, part of the wireless communication manager 920 may be incorporated into or shared with the receiver 910 or the transmitter 930. In some examples, the wireless communication manager 920 may include a co-located downlink carrier identifier 935, a RRM measurement manager 940, a RRM measurement combiner 945, or a RRM measurement report transmitter 950.

The co-located downlink carrier identifier 935 may be used to receive an indication of co-located downlink carriers in the shared radio frequency spectrum band.

The RRM measurement manager 940 may be used to perform a plurality of RRM measurements for the downlink carriers. In some examples, performing the plurality of RRM measurements may include measuring a number of reference signals (e.g., CRSs or DRSs) received on the downlink carriers. The number of reference signals may be associated with a fixed total transmit power across a plurality of time intervals. In some examples, the RRM measurements may include at least one of RSRP measurements, RSRQ measurements, RSSI measurements, or a combination thereof.

The RRM measurement combiner 945 may be used to combine the RRM measurements over a time interval in the shared radio frequency spectrum band based at least in part on the received indication. In some examples (e.g., in the case of RSRP measurements or RSRQ measurements), the combining may include a summing. In some examples (e.g., in the case of RSSI measurements), the combining may include an averaging.

The RRM measurement report transmitter 950 may be used to transmit a report based at least in part on the combined RRM measurements to a base station.

Figure 10:
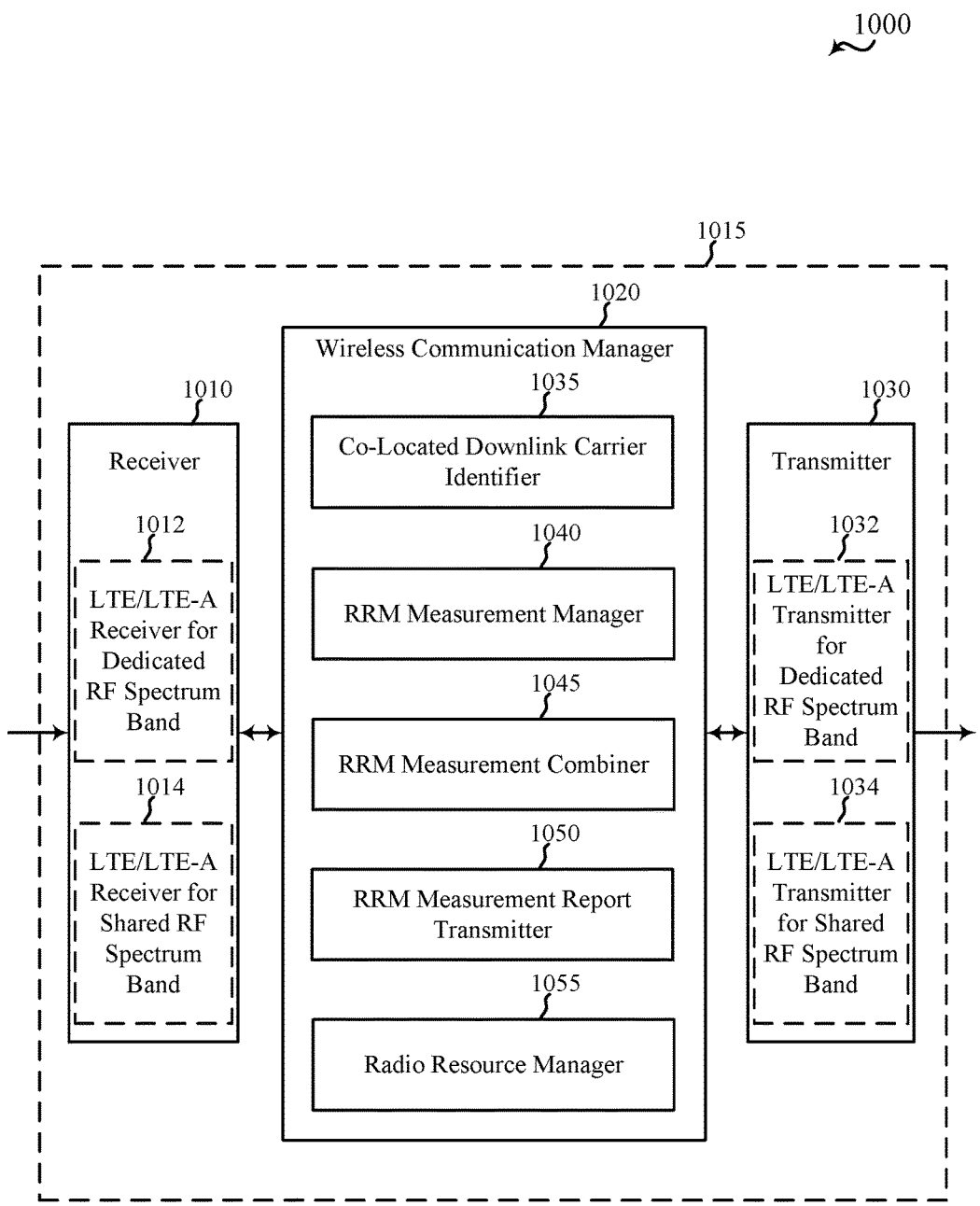
FIG. 10 shows a block diagram of an apparatus for use in wireless communication, in accordance with various aspects of the present disclosure.

FIG. 10 shows a block diagram 1000 of an apparatus 1015 for use in wireless communication, in accordance with various aspects of the present disclosure. The apparatus 1015 may be an example of aspects of one or more of the UEs 115, 215, 215-*a*, 215-*b*, 215-*c*, 315, 415, 515, or 615 described with reference to FIG. 1, 2, 3, 4, 5, or 6, or aspects of the apparatus 1015 described with reference to FIG. 10. The apparatus 1015 may also be or include a processor. The apparatus 1015 may include a receiver 1010, a wireless communication manager 1020, or a transmitter 1030. Each of these components may be in communication with each other.

The components of the apparatus 1015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, or 6. The receiver 1010 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1012), and an LTE/LTE-A receiver for communicating over the shared radio frequency spectrum band (e.g., LTE/LTE-A receiver for shared RF spectrum band 1014). The receiver 1010, including the LTE/LTE-A receiver for dedicated RF spectrum band 1012 or the LTE/LTE-A receiver for shared RF spectrum band 1014, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1030 may include at least one RF transmitter, such as at least one RF transmitter operable to transmit over the dedicated radio frequency spectrum band or the shared radio frequency spectrum band. The transmitter 1030 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1032), and an LTE/LTE-A transmitter for communicating over the shared radio frequency spectrum band (e.g., LTE/LTE-A transmitter for shared RF spectrum band 1034). The transmitter 1030, including the LTE/LTE-A transmitter for dedicated RF spectrum band 1032 or the LTE/LTE-A transmitter for shared RF spectrum band 1034, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 1020 may be used to manage one or more aspects of wireless communication for the apparatus 1015. In some examples, part of the wireless communication manager 1020 may be incorporated into or shared with the receiver 1010 or the transmitter 1030. In some examples, the wireless communication manager 1020 may include a co-located downlink carrier identifier 1035, a RRM measurement manager 1040, a RRM measurement combiner 1045, or a RRM measurement report transmitter 1050, or a radio resource manager 1055.

The co-located downlink carrier identifier 1035 may be used to receive an indication of co-located downlink carriers in the shared radio frequency spectrum band.

The RRM measurement manager 1040 may be used to perform a plurality of RRM measurements for the downlink carriers. In some examples, performing the plurality of RRM measurements may include measuring a number of reference signals (e.g., CRSs or DRSs) received on the downlink carriers. The number of reference signals may be associated with a fixed total transmit power across a plurality of time intervals. In some examples, the RRM measurements may include at least one of RSRP measurements, RSRQ measurements, RSSI measurements, or a combination thereof.

The RRM measurement combiner 1045 may be used to combine the RRM measurements over a time interval in the shared radio frequency spectrum band based at least in part on the received indication. In some examples (e.g., in the case of RSRP measurements or RSRQ measurements), the combining may include a summing. In some examples (e.g., in the case of RSSI measurements), the combining may include an averaging. In some examples, the RRM measurement combiner 1045 may also be used to average the combined RRM measurements across a plurality of time intervals.

The RRM measurement report transmitter 1050 may be used to transmit a report based at least in part on the combined RRM measurements to a base station. In some examples, the report may include an average of the combined RRM measurements.

The radio resource manager 1055 may be used to perform radio resource management based at least in part on the combined RRM measurements. In some examples, performing radio resource management may include at least one of determining whether to remain associated with the base station, or identifying a candidate base station for association or handover.

Figure 11:
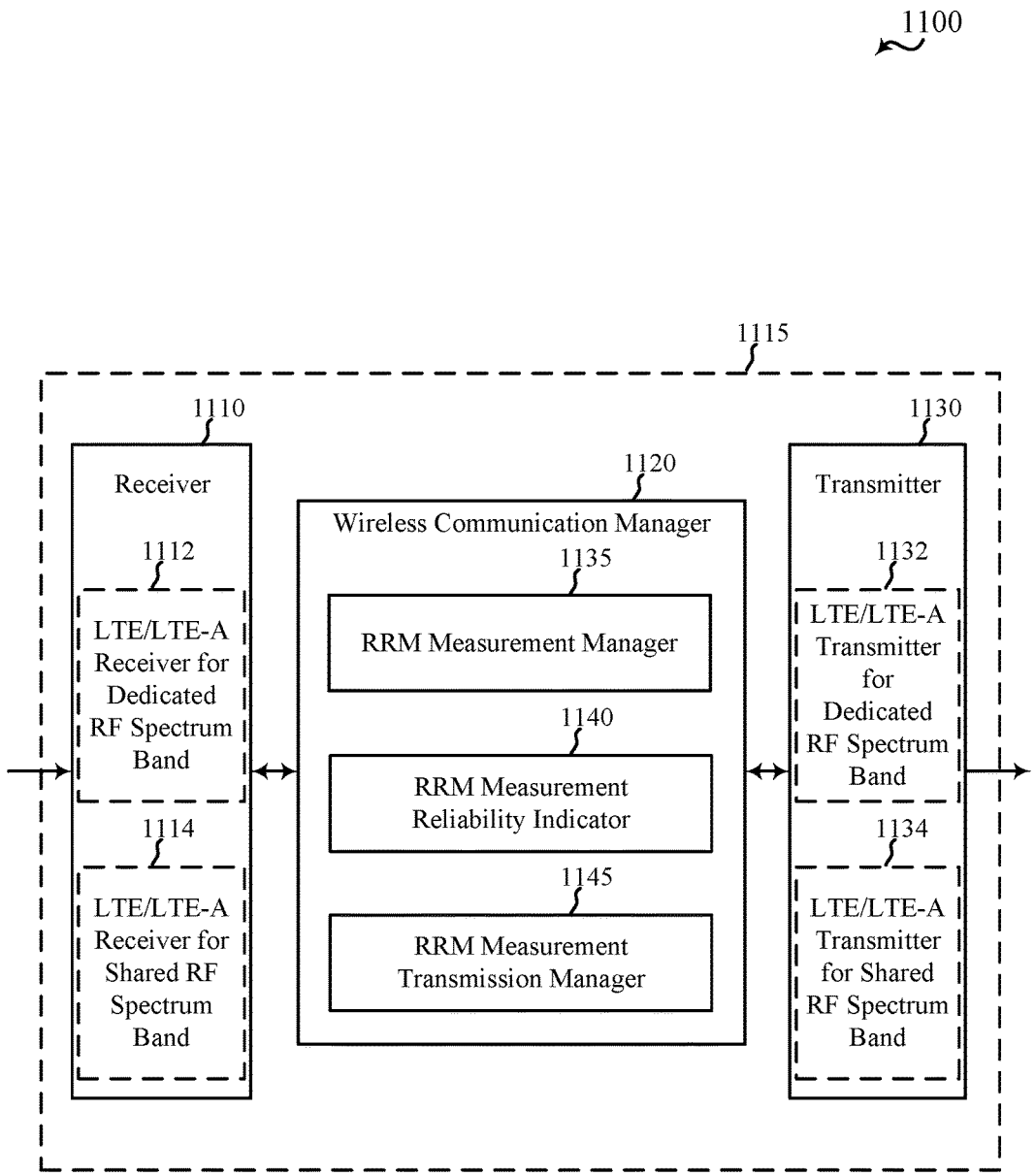
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. The apparatus 1115 may be an example of aspects of one or more of the UEs 115, 215, 215-*a*, 215-*b*, 215-*c*, 315, 415, 515, or 615 described with reference to FIG. 1, 2, 3, 4, 5, or 6. The apparatus 1115 may also be or include a processor. The apparatus 1115 may include a receiver 1110, a wireless communication manager 1120, or a transmitter 1130. Each of these components may be in communication with each other.

The components of the apparatus 1115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1110 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, or 6. The receiver 1110 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1112), and an LTE/LTE-A receiver for communicating over the shared radio frequency spectrum band (e.g., LTE/LTE-A receiver for shared RF spectrum band 1114). The receiver 1110, including the LTE/LTE-A receiver for dedicated RF spectrum band 1112 or the LTE/LTE-A receiver for shared RF spectrum band 1114, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1130 may include at least one RF transmitter, such as at least one RF transmitter operable to transmit over the dedicated radio frequency spectrum band or the shared radio frequency spectrum band. The transmitter 1130 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1132), and an LTE/LTE-A transmitter for communicating over the shared radio frequency spectrum band (e.g., LTE/LTE-A transmitter for shared RF spectrum band 1134). The transmitter 1130, including the LTE/LTE-A transmitter for dedicated RF spectrum band 1132 or the LTE/LTE-A transmitter for shared RF spectrum band 1134, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 1120 may be used to manage one or more aspects of wireless communication for the apparatus 1115. In some examples, part of the wireless communication manager 1120 may be incorporated into or shared with the receiver 1110 or the transmitter 1130. In some examples, the wireless communication manager 1120 may include a RRM measurement manager 1135, a RRM measurement reliability indicator 1140, or a RRM measurement transmission manager 1145.

The RRM measurement manager 1135 may be used to perform a plurality of RRM measurements for a downlink carrier in the shared radio frequency spectrum band. In some examples, a RRM measurement may be performed when the downlink carrier is active (e.g., during a LBT radio frame or LBT transmission burst for which contention for access to the shared radio frequency spectrum band has been won), but not when the downlink carrier is inactive (e.g., during a LBT radio frame or LBT transmission burst for which contention for access to the shared radio frequency spectrum band has been lost). In some examples, performing the plurality of RRM measurements may include measuring a plurality of reference signals (e.g., CRSs or DRSs) received on the downlink carrier.

The RRM reliability indicator 1140 may be used to determine a reliability of the RRM measurements. In some examples, determining the reliability of the RRM measurements may include identifying an elapsed time without performing a valid RRM measurement. In some examples, determining the reliability of the RRM measurements may include counting a number of the RRM measurements performed during a period of time.

The RRM measurement transmission manager 1145 may be used to transmit data corresponding to the RRM measurements and an indication of the reliability of the RRM measurements to a base station.

Figure 12:
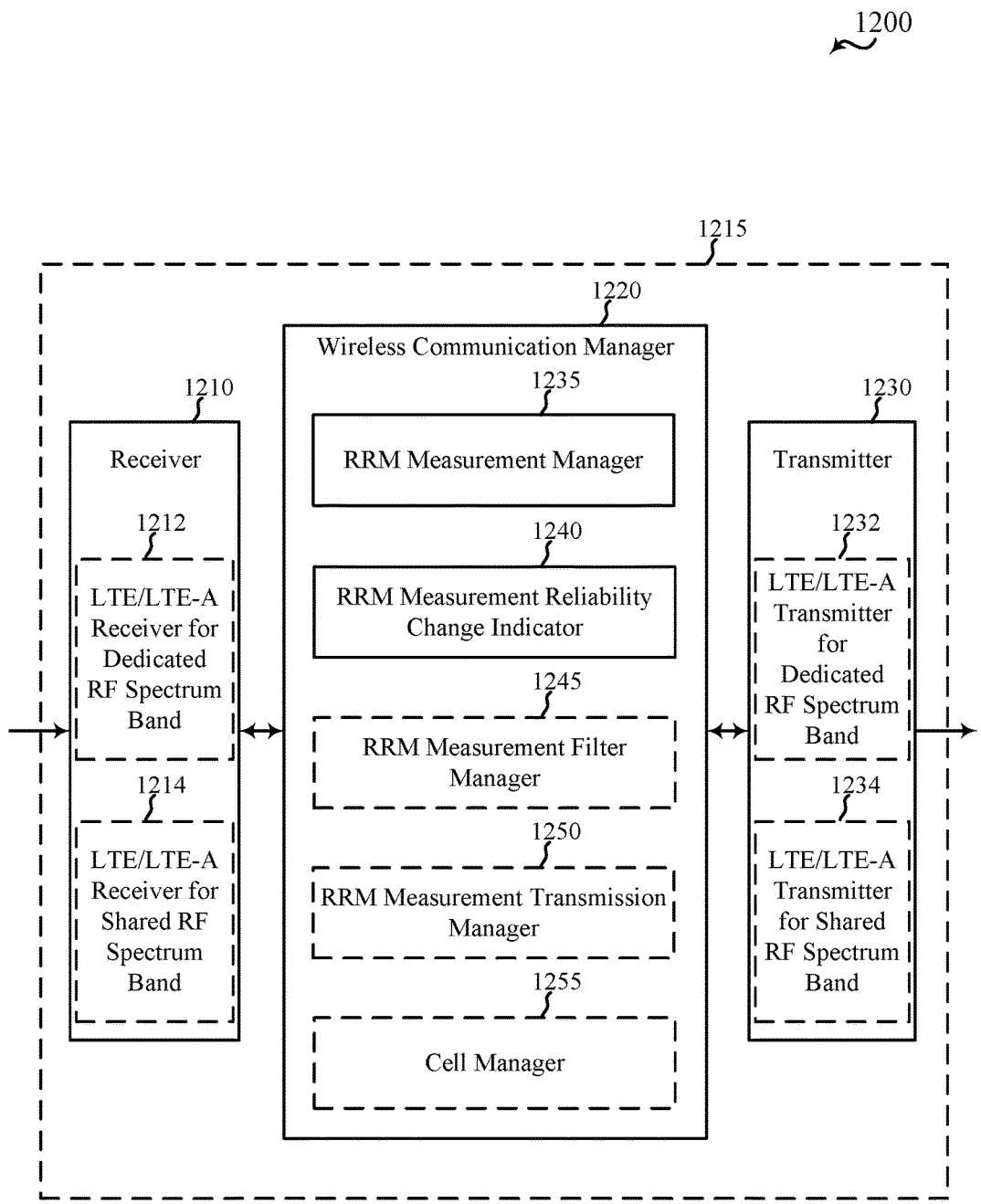
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. The apparatus 1215 may be an example of aspects of one or more of the UEs 115, 215, 215-*a*, 215-*b*, 215-*c*, 315, 415, 515, or 615 described with reference to FIG. 1, 2, 3, 4, 5, or 6. The apparatus 1215 may also be or include a processor. The apparatus 1215 may include a receiver 1210, a wireless communication manager 1220, or a transmitter 1230. Each of these components may be in communication with each other.

The components of the apparatus 1215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1210 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, or 6. The receiver 1210 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1212), and an LTE/LTE-A receiver for communicating over the shared radio frequency spectrum band (e.g., LTE/LTE-A receiver for shared RF spectrum band 1214). The receiver 1210, including the LTE/LTE-A receiver for dedicated RF spectrum band 1212 or the LTE/LTE-A receiver for shared RF spectrum band 1214, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1230 may include at least one RF transmitter, such as at least one RF transmitter operable to transmit over the dedicated radio frequency spectrum band or the shared radio frequency spectrum band. The transmitter 1230 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1232), and an LTE/LTE-A transmitter for communicating over the shared radio frequency spectrum band (e.g., LTE/LTE-A transmitter for shared RF spectrum band 1234). The transmitter 1230, including the LTE/LTE-A transmitter for dedicated RF spectrum band 1232 or the LTE/LTE-A transmitter for shared RF spectrum band 1234, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 1220 may be used to manage one or more aspects of wireless communication for the apparatus 1215. In some examples, part of the wireless communication manager 1220 may be incorporated into or shared with the receiver 1210 or the transmitter 1230. In some examples, the wireless communication manager 1220 may include a RRM measurement manager 1235, a RRM measurement reliability change indicator 1240, an optional RRM measurement filter manager 1245, an optional RRM measurement transmission manager 1250, or an optional cell manager 1255.

The RRM measurement manager 1235 may be used to perform a plurality of RRM measurements for a downlink carrier in the shared radio frequency spectrum band. In some examples, an RRM measurement may be performed when the downlink carrier is active (e.g., during a LBT radio frame or LBT transmission burst for which contention for access to the shared radio frequency spectrum band has been won), but not when the downlink carrier is inactive (e.g., during a LBT radio frame or LBT transmission burst for which contention for access to the shared radio frequency spectrum band has been lost). In some examples, performing the plurality of RRM measurements may include measuring a plurality of reference signals (e.g., CRSs or DRSs) received on the downlink carrier.

The RRM measurement reliability change indicator 1240 may be used to identify a change in a reliability of the RRM measurements. In some examples identifying a change in a reliability of the RRM measurements may include identifying a change in an elapsed time without performing a valid RRM measurement. In some examples, identifying a change in a reliability of the RRM measurements may include identifying a change in a number of RRM measurements performed during a period of time.

The RRM measurement filter manager 1245 may be used to optionally reset a RRM measurement filter for a cell corresponding to the downlink carrier, in response to the RRM measurement reliability change indicator 1240 identifying a change in reliability of RRM measurements.

The RRM measurement transmission manager 1250 may be used to optionally trigger a transmittal of a measurement report to a base station, or withhold a transmittal of data corresponding to the RRM measurements to the base station, in response to the RRM measurement reliability change indicator 1240 identifying a change in reliability of RRM measurements.

The cell manager 1255 may be used to optionally identify a cell corresponding to the downlink carrier as non-detectable in response to the RRM measurement reliability change indicator 1240 identifying a change in reliability of RRM measurements.

Figure 13:
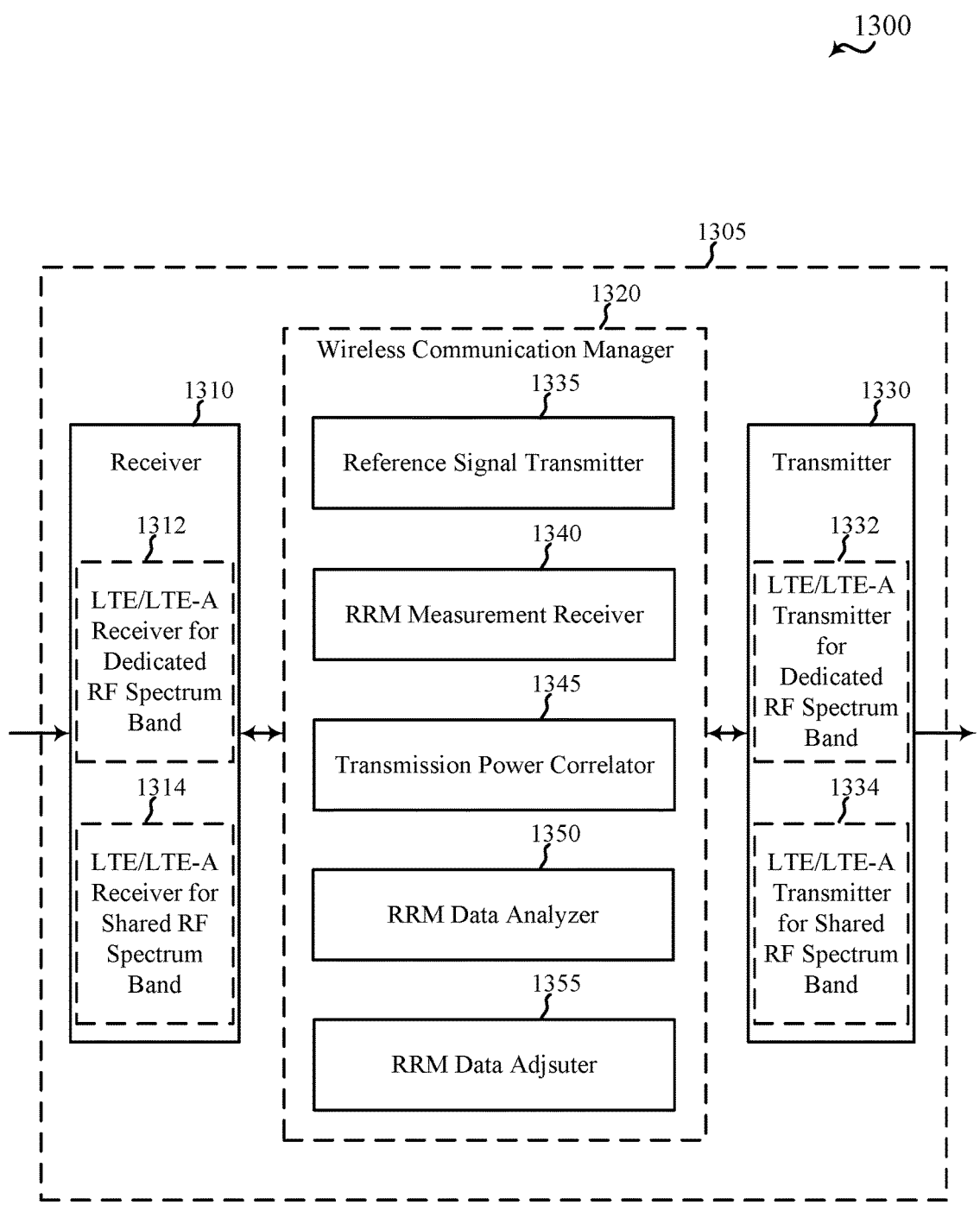
FIG. 13 shows a block diagram of an apparatus for use in wireless communication, in accordance with various aspects of the present disclosure.

FIG. 13 shows a block diagram 1300 of an apparatus 1305 for use in wireless communication, in accordance with various aspects of the present disclosure. The apparatus 1305 may be an example of aspects of one or more of the base stations 105, 205, 205-*a*, 305, 405, 505, or 605 described with reference to FIG. 1, 2, 3, 4, 5, or 6. The apparatus 1305 may also be or include a processor. The apparatus 1305 may include a receiver 1310, a wireless communication manager 1320, or a transmitter 1330. Each of these components may be in communication with each other.

The components of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1310 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, or 6. The receiver 1310 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1312), and an LTE/LTE-A receiver for communicating over the shared radio frequency spectrum band (e.g., LTE/LTE-A receiver for shared RF spectrum band 1314). The receiver 1310, including the LTE/LTE-A receiver for dedicated RF spectrum band 1312 or the LTE/LTE-A receiver for shared RF spectrum band 1314, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1330 may include at least one RF transmitter, such as at least one RF transmitter operable to transmit over the dedicated radio frequency spectrum band or the shared radio frequency spectrum band. The transmitter 1330 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1332), and an LTE/LTE-A transmitter for communicating over the shared radio frequency spectrum band (e.g., LTE/LTE-A transmitter for shared RF spectrum band 1334). The transmitter 1330, including the LTE/LTE-A transmitter for dedicated RF spectrum band 1332 or the LTE/LTE-A transmitter for shared RF spectrum band 1334, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 1320 may be used to manage one or more aspects of wireless communication for the apparatus 1305. In some examples, part of the wireless communication manager 1320 may be incorporated into or shared with the receiver 1310 or the transmitter 1330. In some examples, the wireless communication manager 720 may include a reference signal transmitter 1335, a RRM measurement receiver 1340, a transmission power correlator 1345, an optional RRM data analyzer 1350, or a RRM data adjuster 1355.

The reference signal transmitter 1335 may be used to record transmission power indications and transmission time indications for a plurality of reference signals (e.g., CRSs or DRSs) transmitted to a UE. In some examples, the reference signal transmitter 1335 may also record first carrier indications for the plurality of reference signals. In some examples, the reference signals may be transmitted on a number of active downlink carriers in a shared radio frequency spectrum band. In some examples, the active downlink carriers may include a set of one or more carriers for which contention for access to the shared radio frequency spectrum band has been won.

The RRM measurement receiver 1340 may be used to receive, from the UE, data corresponding to a plurality of RRM measurements, measurement time indications associated with the RRM measurements, and optionally second carrier indications associated with the RRM measurements. The RRM measurements may be based at least in part on the reference signals (e.g., measurements of the reference signals) transmitted using the reference signal transmitter 1335.

The transmission power correlator 1345 may be used to correlate the transmission power indications with the data based at least in part on a correlation between the measurement time indications and the transmission time indications (and optionally, based on a correlation of the second carrier indications with the first carrier indications).

The RRM data analyzer 1350 may be used to optionally identify, from the correlating, at least one reference signal for which data corresponding to a RRM measurement is not received. The RRM data analyzer 1350 may also be used to optionally identify, from the correlating, data corresponding to at least one outlier RRM measurement.

The RRM data adjuster 1355 may be used to adjust the data (received by the RRM measurement receiver 1340) based at least in part on the correlating (performed by the transmission power correlator 1345).

Figure 14:
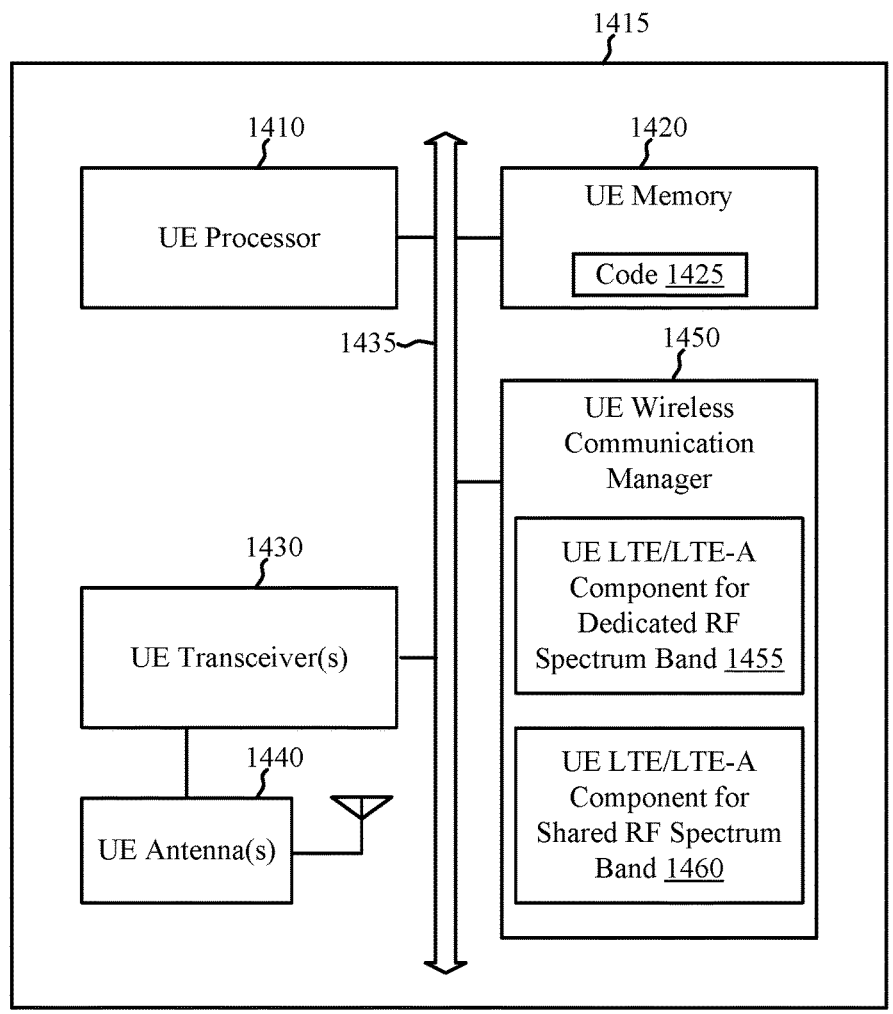
FIG. 14 shows a block diagram of a UE for use in wireless communication, in accordance with various aspects of the present disclosure.

FIG. 14 shows a block diagram 1400 of a UE 1415 for use in wireless communication, in accordance with various aspects of the present disclosure. The UE 1415 may be included or be part of a personal computer (e.g., a laptop computer, a netbook computer, a tablet computer, etc.), a cellular telephone, a PDA, a DVR, an internet appliance, a gaming console, an e-reader, etc. The UE 1415 may, in some examples, have an internal power supply (not shown), such as a small battery, to facilitate mobile operation. In some examples, the UE 1415 may be an example of aspects of one or more of the UEs 115, 215, 215-*a*, 215-*b*, 215-*c*, 315, 415, 515, or 615 described with reference to FIG. 1, 2, 3, 4, 5, or 6, or aspects of one or more of the apparatuses 715, 815, 915, 1015, 1115, or 1215 described with reference to FIG. 7, 8, 9, 10, 11, or 12. The UE 1415 may be configured to implement at least some of the UE or apparatus techniques and functions described with reference to FIG. 1, 2, 3, 4, 5, 6, 7, 8, 9, 10, 11, or 12.

The UE 1415 may include a UE processor 1410, a UE memory 1420, at least one UE transceiver (represented by UE transceiver(s) 1430), at least one UE antenna (represented by UE antenna(s) 1440), or a UE wireless communication manager 1450. Each of these components may be in communication with each other, directly or indirectly, over one or more buses 1435.

The UE memory 1420 may include random access memory (RAM) or read-only memory (ROM). The UE memory 1420 may store computer-readable, computer-executable code 1425 containing instructions that are configured to, when executed, cause the UE processor 1410 to perform various functions described herein related to wireless communication, including, for example, the performance of RRM measurements, the transmittal of data or reports corresponding to the RRM measurements, and the performance of radio resource management operations. Alternatively, the computer-executable code 1425 may not be directly executable by the UE processor 1410 but be configured to cause the UE 1415 (e.g., when compiled and executed) to perform various of the functions described herein.

The UE processor 1410 may include an intelligent hardware device, e.g., a central processing unit (CPU), a microcontroller, an ASIC, etc. The UE processor 1410 may process information received through the UE transceiver(s) 1430 or information to be sent to the UE transceiver(s) 1430 for transmission through the UE antenna(s) 1440. The UE processor 1410 may handle, alone or in connection with the UE wireless communication manager 1450, various aspects of communicating over (or managing communications over) a dedicated radio frequency spectrum band or the shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

The UE transceiver(s) 1430 may include a modem configured to modulate packets and provide the modulated packets to the UE antenna(s) 1440 for transmission, and to demodulate packets received from the UE antenna(s) 1440. The UE transceiver(s) 1430 may, in some examples, be implemented as one or more UE transmitters and one or more separate UE receivers. The UE transceiver(s) 1430 may support communications in the dedicated radio frequency spectrum band or the shared radio frequency spectrum band. The UE transceiver(s) 1430 may be configured to communicate bi-directionally, via the UE antenna(s) 1440, with one or more of the base stations 105, 205, 205-*a*, 305, 405, 505, or 605 described with reference to FIG. 1, 2, 3, 4, 5, or 6, or the apparatus 1305 described with reference to FIG. 13. While the UE 1415 may include a single UE antenna, there may be examples in which the UE 1415 may include multiple UE antennas 1440.

The UE wireless communication manager 1450 may be configured to perform or control some or all of the UE or apparatus techniques or functions described with reference to FIG. 1, 2, 3, 4, 5, 6, 7, 8, 9, 10, 11, or 12 related to wireless communication over the dedicated radio frequency spectrum band or the shared radio frequency spectrum band. For example, the UE wireless communication manager 1450 may be configured to support a supplemental downlink mode (e.g., a licensed assisted access mode), a carrier aggregation mode, or a standalone mode using the dedicated radio frequency spectrum band or the shared radio frequency spectrum band. The UE wireless communication manager 1450 may include a UE LTE/LTE-A component for dedicated RF spectrum band 1455 configured to handle LTE/LTE-A communications in the dedicated radio frequency spectrum band, and a UE LTE/LTE-A component for shared RF spectrum band 1460 configured to handle LTE/LTE-A communications in the shared radio frequency spectrum band. The UE wireless communication manager 1450, or portions of it, may include a processor, or some or all of the functions of the UE wireless communication manager 1450 may be performed by the UE processor 1410 or in connection with the UE processor 1410. In some examples, the UE wireless communication manager 1450 may be an example of the wireless communication manager 720, 820, 920, 1020, 1120, or 1220 described with reference to FIG. 7, 8, 9, 10, 11, or 12.

Figure 15:
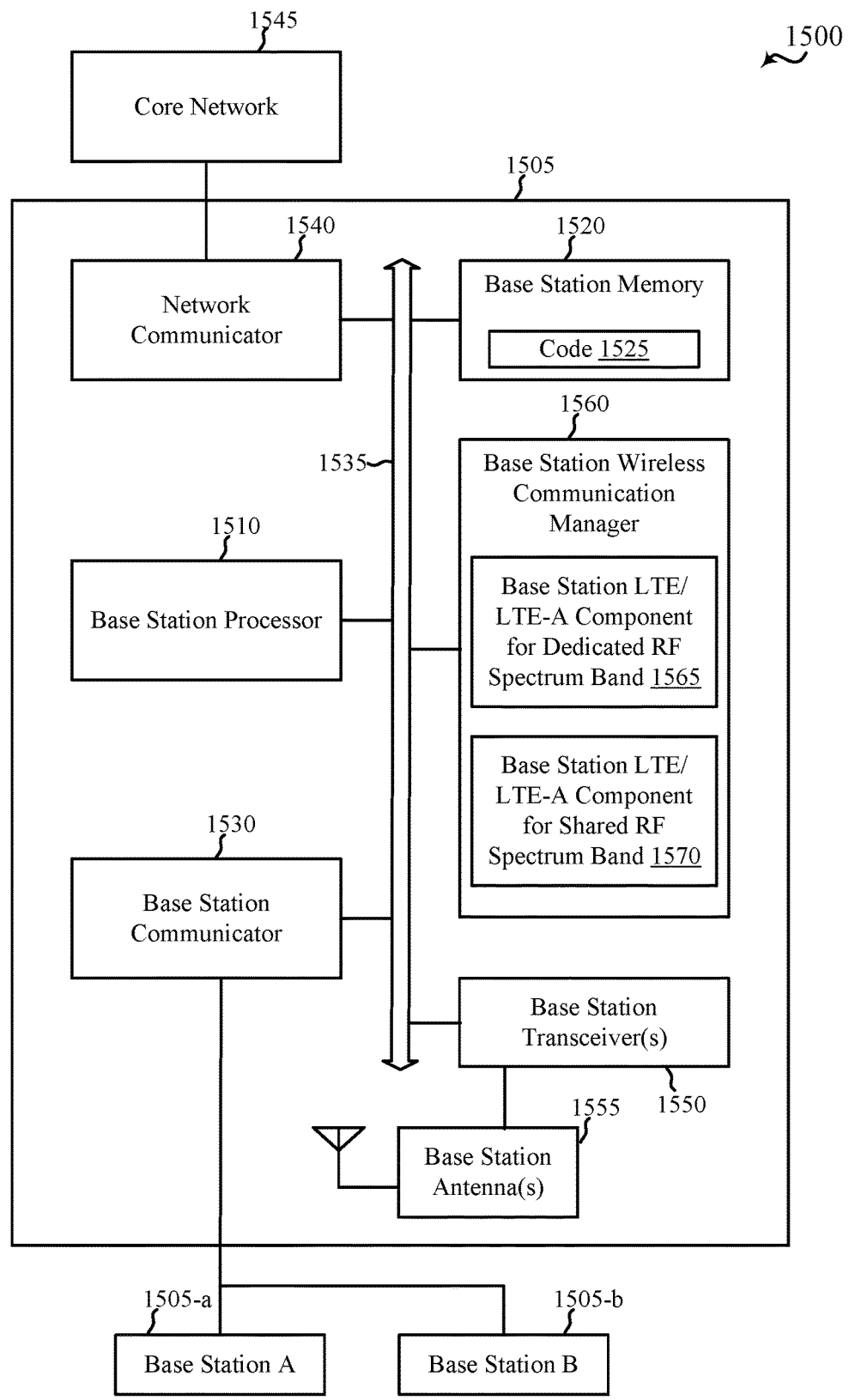
FIG. 15 shows a block diagram of a base station (e.g., a base station forming part or all of an eNB) for use in wireless communication, in accordance with various aspects of the present disclosure.

FIG. 15 shows a block diagram 1500 of a base station 1505 (e.g., a base station forming part or all of an eNB) for use in wireless communication, in accordance with various aspects of the present disclosure. In some examples, the base station 1505 may be an example of one or more aspects of the base stations 105, 205, 205-*a*, 305, 405, 505, or 605 described with reference to FIG. 1, 2, 3, 4, 5, or 6, or aspects of the apparatus 1305 described with reference to FIG. 13. The base station 1505 may be configured to implement or facilitate at least some of the base station techniques and functions described with reference to FIG. 1, 2, 3, 4, 5, 6, or 13.

The base station 1505 may include a base station processor 1510, a base station memory 1520, at least one base station transceiver (represented by base station transceiver(s) 1550), at least one base station antenna (represented by base station antenna(s) 1555), or a base station wireless communication manager 1560. The base station 1505 may also include one or more of a base station communicator 1530 or a network communicator 1540. Each of these components may be in communication with each other, directly or indirectly, over one or more buses 1535.

The base station memory 1520 may include RAM or ROM. The base station memory 1520 may store computer-readable, computer-executable code 1525 containing instructions that are configured to, when executed, cause the base station processor 1510 to perform various functions described herein related to wireless communication, including, for example, the transmission of reference signals and the processing of data or reports corresponding to RRM measurements based on the reference signals. Alternatively, the computer-executable code 1525 may not be directly executable by the base station processor 1510 but be configured to cause the base station 1505 (e.g., when compiled and executed) to perform various of the functions described herein.

The base station processor 1510 may include an intelligent hardware device, e.g., a CPU, a microcontroller, an ASIC, etc. The base station processor 1510 may process information received through the base station transceiver(s) 1550, the base station communicator 1530, or the network communicator 1540. The base station processor 1510 may also process information to be sent to the transceiver(s) 1550 for transmission through the antenna(s) 1555, to the base station communicator 1530, for transmission to one or more other base stations (e.g., base station 1505-*a* and base station 1505-*b*), or to the network communicator 1540 for transmission to a core network 1545, which may be an example of one or more aspects of the core network 130 described with reference to FIG. 1. The base station processor 1510 may handle, alone or in connection with the base station wireless communication manager 1560, various aspects of communicating over (or managing communications over) the dedicated radio frequency spectrum band or the shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

The base station transceiver(s) 1550 may include a modem configured to modulate packets and provide the modulated packets to the base station antenna(s) 1555 for transmission, and to demodulate packets received from the base station antenna(s) 1555. The base station transceiver(s) 1550 may, in some examples, be implemented as one or more base station transmitters and one or more separate base station receivers. The base station transceiver(s) 1550 may support communications in the dedicated radio frequency spectrum band or the shared radio frequency spectrum band. The base station transceiver(s) 1550 may be configured to communicate bi-directionally, via the antenna(s) 1555, with one or more UEs or apparatuses, such as one or more of the UEs 115, 215, 215-*a*, 315, 415, 515, 615, or 1415 described with reference to FIG. 1, 2, 3, 4, 5, 6, or 14, or one or more of the apparatuses 715, 815, 915, 1015, 1115, or 1215 described with reference to FIG. 7, 8, 9, 10, 11, or 12. The base station 1505 may, for example, include multiple base station antennas 1555 (e.g., an antenna array). The base station 1505 may communicate with the core network 1545 through the network communicator 1540. The base station 1505 may also communicate with other base stations, such as the base station 1505-*a* and the base station 1505-*b*, using the base station communicator 1530.

The base station wireless communication manager 1560 may be configured to perform or control some or all of the techniques or functions described with reference to FIG. 1, 2, 3, 4, 5, 6, or 13 related to wireless communication over the dedicated radio frequency spectrum band or the shared radio frequency spectrum band. For example, the base station wireless communication manager 1560 may be configured to support a supplemental downlink mode (e.g., a licensed assisted access mode), a carrier aggregation mode, or a standalone mode using the dedicated radio frequency spectrum band or the shared radio frequency spectrum band. The base station wireless communication manager 1560 may include a base station LTE/LTE-A component for dedicated RF spectrum band 1565 configured to handle LTE/LTE-A communications in the dedicated radio frequency spectrum band, and a base station LTE/LTE-A component for shared RF spectrum band 1570 configured to handle LTE/LTE-A communications in the shared radio frequency spectrum band. The base station wireless communication manager 1560, or portions of it, may include a processor, or some or all of the functions of the base station wireless communication manager 1560 may be performed by the base station processor 1510 or in connection with the base station processor 1510. In some examples, the base station wireless communication manager 1560 may be an example of the wireless communication manager 1320 described with reference to FIG. 13.

Figure 16:
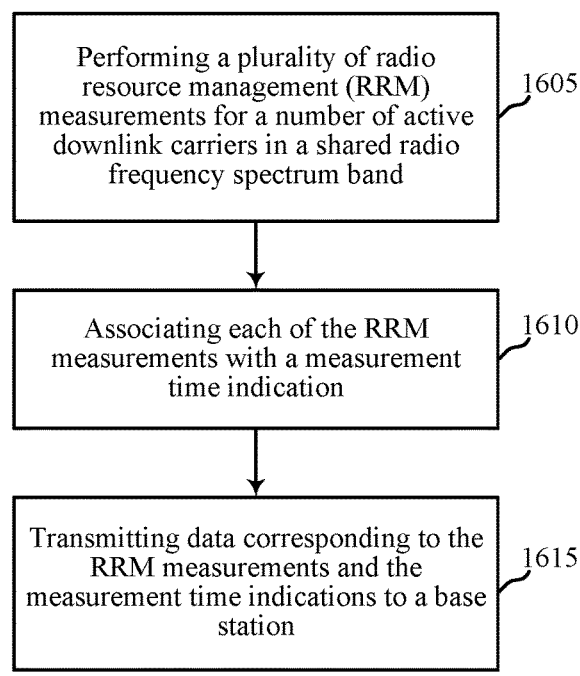
FIG. 16 is a flow chart illustrating an example of a method for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs 115, 215, 215-*a*, 215-*b*, 215-*c*, 315, 415, 515, 615, or 1415 described with reference to FIG. 1, 2, 3, 4, 5, 6, or 14, or aspects of one or more of the apparatuses 715, 815, 915, 1015, 1115, or 1215 described with reference to FIG. 7, 8, 9, 10, 11, or 12. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include performing a plurality of RRM measurements for a number of active downlink carriers in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). In some examples, the active downlink carriers may include a set of one or more downlink carriers for which contention for access to the shared radio frequency spectrum band has been won. The downlink carriers included in the set of one or more downlink carriers may change from one LBT radio frame or LBT transmission burst to another LBT radio frame or LBT transmission burst, depending on whether contention for access to each of a plurality of downlink carriers is won or lost for a LBT radio frame or LBT transmission burst. In some examples, performing the plurality of RRM measurements may include measuring a plurality of reference signals (e.g., CRSs or DRSs) received on the number of active downlink carriers. The plurality of reference signals may be associated with variable transmit powers across a plurality of time intervals. In some examples, the RRM measurements may include at least one of RSRP measurements, RSRQ measurements, RSSI measurements, or a combination thereof. The operation(s) at block 1605 may be performed using the wireless communication manager 720, 820, 920, 1020, 1120 or 1220 or UE wireless communication manager 1450 described with reference to FIG. 7, 8, 9, 10, 11, 12, or 14, or the RRM measurement manager 735 or 835 described with reference to FIG. 7 or 8.

At block 1610, the method 1600 may include associating each of the RRM measurements with a measurement time indication. In some examples, associating each of the RRM measurements with a measurement time indication may include associating at least one of the RRM measurements with a subframe number corresponding to a subframe in which the RRM measurement is performed. In some examples, associating each of the RRM measurements with a measurement time indication may further include associating the RRM measurement with a measurement order. In some examples, each of an RSRP measurement, a RSRQ measurement, and a RSSI measurement (or other measurement components) may be associated with a separate or different measurement time indication. The operation(s) at block 1610 may be performed using the wireless communication manager 720, 820, 920, 1020, 1120 or 1220 or UE wireless communication manager 1450 described with reference to FIG. 7, 8, 9, 10, 11, 12, or 14, the RRM measurement parameter indicator 740 or 840 described with reference to FIG. 7 or 8, or the measurement time indicator 850 described with reference to FIG. 8.

At block 1615, the method 1600 may include transmitting data corresponding to the RRM measurements and the measurement time indications to a base station. The operation(s) at block 1615 may be performed using the wireless communication manager 720, 820, 920, 1020, 1120 or 1220 or UE wireless communication manager 1450 described with reference to FIG. 7, 8, 9, 10, 11, 12, or 14, or the RRM measurement transmission manager 745 or 845 described with reference to FIG. 7 or 8.

Thus, the method 1600 may provide for wireless communication. It should be noted that the method 1600 is just one implementation and that the operations of the method 1600 may be rearranged or otherwise modified such that other implementations are possible.

Figure 17:
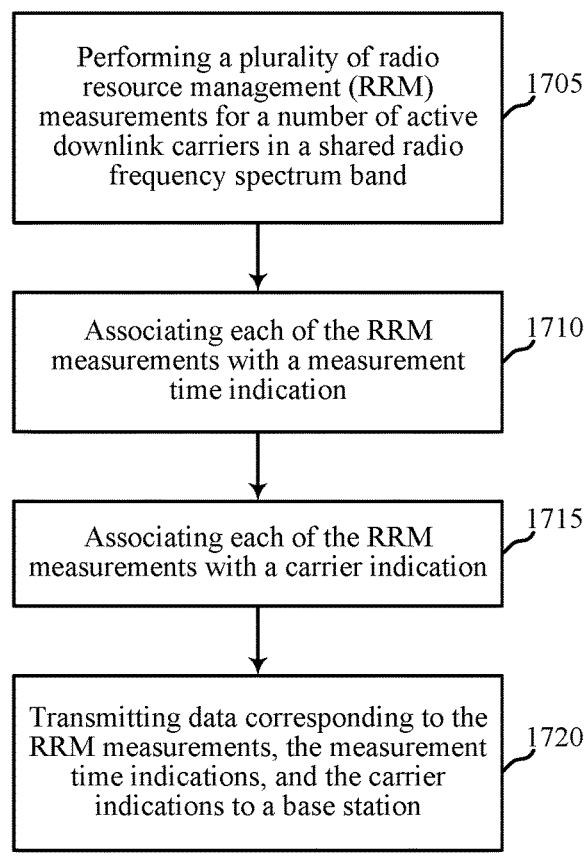
FIG. 17 is a flow chart illustrating an example of a method for wireless communication at a UE, in accordance with various aspects of the present disclosure.

FIG. 17 is a flow chart illustrating an example of a method 1700 for wireless communication at a UE, in accordance with various aspects of the present disclosure. For clarity, the method 1700 is described below with reference to aspects of one or more of the UEs 115, 215, 215-*a*, 215-*b*, 215-*c*, 315, 415, 515, 615, or 1415 described with reference to FIG. 1, 2, 3, 4, 5, 6, or 14, or aspects of one or more of the apparatuses 715, 815, 915, 1015, 1115, or 1215 described with reference to FIG. 7, 8, 9, 10, 11, or 12. In some examples, a UE may execute one or more sets of codes to control the functional elements of the UE to perform the functions described below. Additionally or alternatively, the UE may perform one or more of the functions described below using special-purpose hardware.

At block 1705, the method 1700 may include performing a plurality of RRM measurements for a number of active downlink carriers in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). In some examples, the active downlink carriers may include a set of one or more downlink carriers for which contention for access to the shared radio frequency spectrum band has been won. The downlink carriers included in the set of one or more downlink carriers may change from one LBT radio frame or LBT transmission burst to another LBT radio frame or LBT transmission burst, depending on whether contention for access to each of a plurality of downlink carriers is won or lost for a LBT radio frame or LBT transmission burst. In some examples, performing the plurality of RRM measurements may include measuring a plurality of reference signals (e.g., CRSs or DRSs) received on the number of active downlink carriers. The plurality of reference signals may be associated with variable transmit powers across a plurality of time intervals. In some examples, the RRM measurements may include at least one of RSRP measurements, RSRQ measurements, RSSI measurements, or a combination thereof. The operation(s) at block 1705 may be performed using the wireless communication manager 720, 820, 920, 1020, 1120 or 1220 or UE wireless communication manager 1450 described with reference to FIG. 7, 8, 9, 10, 11, 12, or 14, or the RRM measurement manager 735 or 835 described with reference to FIG. 7 or 8.

At block 1710, the method 1700 may include associating each of the RRM measurements with a measurement time indication. In some examples, associating each of the RRM measurements with a measurement time indication may include associating at least one of the RRM measurements with a subframe number corresponding to a subframe in which the RRM measurement is performed. In some examples, associating each of the RRM measurements with a measurement time indication may further include associating the RRM measurement with a measurement order. In some examples, each of an RSRP measurement, a RSRQ measurement, and a RSSI measurement (or other measurement components) may be associated with a separate or different measurement time indication. The operation(s) at block 1710 may be performed using the wireless communication manager 720, 820, 920, 1020, 1120 or 1220 or UE wireless communication manager 1450 described with reference to FIG. 7, 8, 9, 10, 11, 12, or 14, the RRM measurement parameter indicator 740 or 840 described with reference to FIG. 7 or 8, or the measurement time indicator 850 described with reference to FIG. 8.

At block 1715, the method 1700 may include associating each of the RRM measurements with a carrier indication. The operation(s) at block 1715 may be performed using the wireless communication manager 720, 820, 920, 1020, 1120 or 1220 or UE wireless communication manager 1450 described with reference to FIG. 7, 8, 9, 10, 11, 12, or 14, the RRM measurement parameter indicator 740 or 840 described with reference to FIG. 7 or 8, or the carrier indicator 855 described with reference to FIG. 8.

At block 1720, the method 1700 may include transmitting data corresponding to the RRM measurements, the measurement time indications, and the carrier indications to a base station. The operation(s) at block 1720 may be performed using the wireless communication manager 720, 820, 920, 1020, 1120 or 1220 or UE wireless communication manager 1450 described with reference to FIG. 7, 8, 9, 10, 11, 12, or 14, or the RRM measurement transmission manager 745 or 845 described with reference to FIG. 7 or 8.

Thus, the method 1700 may provide for wireless communication. It should be noted that the method 1700 is just one implementation and that the operations of the method 1700 may be rearranged or otherwise modified such that other implementations are possible.

Figure 18:
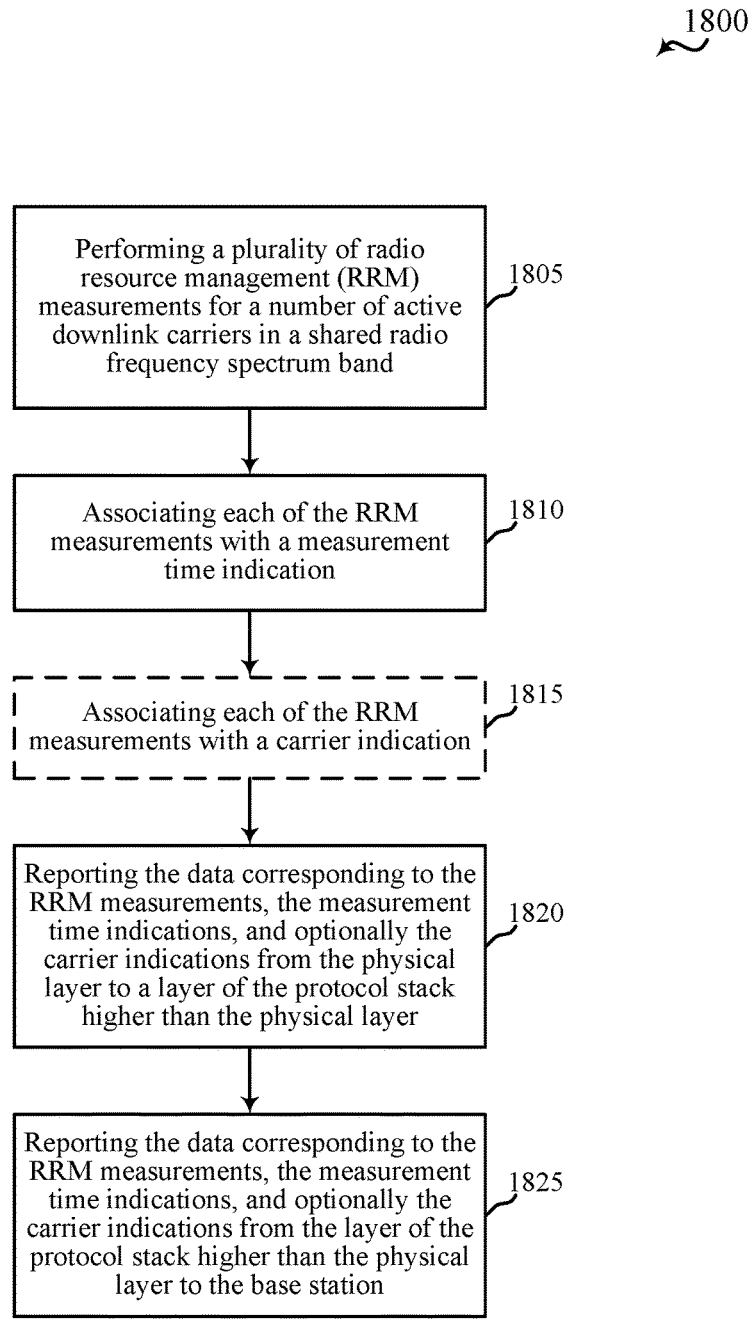
FIG. 18 is a flow chart illustrating an example of a method for wireless communication at a UE, in accordance with various aspects of the present disclosure.

FIG. 18 is a flow chart illustrating an example of a method 1800 for wireless communication at a UE, in accordance with various aspects of the present disclosure. For clarity, the method 1800 is described below with reference to aspects of one or more of the UEs 115, 215, 215-*a*, 215-*b*, 215-*c*, 315, 415, 515, 615, or 1415 described with reference to FIG. 1, 2, 3, 4, 5, 6, or 14, or aspects of one or more of the apparatuses 715, 815, 915, 1015, 1115, or 1215 described with reference to FIG. 7, 8, 9, 10, 11, or 12. In some examples, a UE may execute one or more sets of codes to control the functional elements of the UE to perform the functions described below. Additionally or alternatively, the UE may perform one or more of the functions described below using special-purpose hardware.

At block 1805, the method 1800 may include performing a plurality of RRM measurements for a number of active downlink carriers in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). In some examples, the active downlink carriers may include a set of one or more downlink carriers for which contention for access to the shared radio frequency spectrum band has been won. The downlink carriers included in the set of one or more downlink carriers may change from one LBT radio frame or LBT transmission burst to another LBT radio frame or LBT transmission burst, depending on whether contention for access to each of a plurality of downlink carriers is won or lost for a LBT radio frame or LBT transmission burst. In some examples, performing the plurality of RRM measurements may include measuring a plurality of reference signals (e.g., CRSs or DRSs) received on the number of active downlink carriers. The plurality of reference signals may be associated with variable transmit powers across a plurality of time intervals. In some examples, the RRM measurements may be performed at a physical layer of a protocol stack. In some examples, the RRM measurements may include at least one of RSRP measurements, RSRQ measurements, RSSI measurements, or a combination thereof. The operation(s) at block 1805 may be performed using the wireless communication manager 720, 820, 920, 1020, 1120 or 1220 or UE wireless communication manager 1450 described with reference to FIG. 7, 8, 9, 10, 11, 12, or 14, or the RRM measurement manager 735 or 835 described with reference to FIG. 7 or 8.

At block 1810, the method 1800 may include associating each of the RRM measurements with a measurement time indication. In some examples, associating each of the RRM measurements with a measurement time indication may include associating at least one of the RRM measurements with a subframe number corresponding to a subframe in which the RRM measurement is performed. In some examples, associating each of the RRM measurements with a measurement time indication may further include associating the RRM measurement with a measurement order. In some examples, the RRM measurements may be associated with the measurement time indications at the physical layer of the protocol stack. In some examples, each of an RSRP measurement, a RSRQ measurement, and a RSSI measurement (or other measurement components) may be associated with a separate or different measurement time indication. The operation(s) at block 1810 may be performed using the wireless communication manager 720, 820, 920, 1020, 1120 or 1220 or UE wireless communication manager 1450 described with reference to FIG. 7, 8, 9, 10, 11, 12, or 14, the RRM measurement parameter indicator 740 or 840 described with reference to FIG. 7 or 8, or the measurement time indicator 850 described with reference to FIG. 8.

At block 1815, the method 1800 may optionally include associating each of the RRM measurements with a carrier indication. In some examples, the RRM measurements may be associated with the carrier indications at the physical layer of the protocol stack. The operation(s) at block 1815 may be performed using the wireless communication manager 720, 820, 920, 1020, 1120 or 1220 or UE wireless communication manager 1450 described with reference to FIG. 7, 8, 9, 10, 11, 12, or 14, the RRM measurement parameter indicator 740 or 840 described with reference to FIG. 7 or 8, or the carrier indicator 855 described with reference to FIG. 8.

At blocks 1820 and 1825, the method 1800 may include transmitting data corresponding to the RRM measurements, the measurement time indications, and optionally the carrier indications to a base station. At block 1820, the method 1800 may include reporting the data corresponding to the RRM measurements and the measurement time indications from the physical layer (e.g., a L1 layer) of the protocol stack to a layer of the protocol stack higher than the physical layer (e.g., a L3 layer). At block 1825, the method 1800 may include reporting the data corresponding to the RRM measurements, the measurement time indications, and optionally the carrier indications from the layer of the protocol stack higher than the physical layer (e.g., the L3 layer) to the base station. The data corresponding to the RRM measurements, the measurement time indications, and optionally the carrier indications may include unfiltered and non-averaged values transmitted from the physical layer to the base station (e.g., from the L1 layer to the L3 layer to the base station). The operations at blocks 1820 and 1825 may be performed using the wireless communication manager 720, 820, 920, 1020, 1120 or 1220 or UE wireless communication manager 1450 described with reference to FIG. 7, 8, 9, 10, 11, 12, or 14, the RRM measurement transmission manager 745 or 845 described with reference to FIG. 7 or 8, or the internal reporting manager 860 or external reporting manager 865 described with reference to FIG. 8.

Thus, the method 1800 may provide for wireless communication. It should be noted that the method 1800 is just one implementation and that the operations of the method 1800 may be rearranged or otherwise modified such that other implementations are possible.

Figure 19:
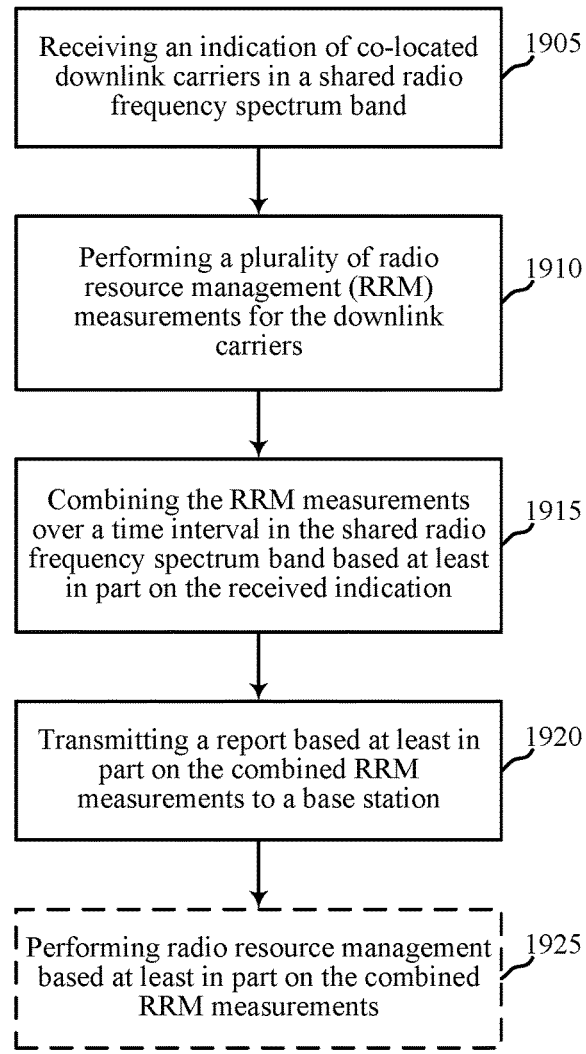
FIG. 19 is a flow chart illustrating an example of a method for wireless communication at a UE, in accordance with various aspects of the present disclosure.

FIG. 19 is a flow chart illustrating an example of a method 1900 for wireless communication at a UE, in accordance with various aspects of the present disclosure. For clarity, the method 1900 is described below with reference to aspects of one or more of the UEs 115, 215, 215-a, 215-b, 215-c, 315, 415, 515, 615, or 1415 described with reference to FIG. 1, 2, 3, 4, 5, 6, or 14, or aspects of one or more of the apparatuses 715, 815, 915, 1015, 1115, or 1215 described with reference to FIG. 7, 8, 9, 10, 11, or 12. In some examples, a UE may execute one or more sets of codes to control the functional elements of the UE to perform the functions described below. Additionally or alternatively, the UE may perform one or more of the functions described below using special-purpose hardware.

At block 1905, the method 1900 may include receiving an indication of co-located downlink carriers in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 1905 may be performed using the wireless communication manager 720, 820, 920, 1020, 1120 or 1220 or UE wireless communication manager 1450 described with reference to FIG. 7, 8, 9, 10, 11, 12, or 14, or the co-located downlink carrier identifier 935 or 1035 described with reference to FIG. 9 or 10.

At block 1910, the method 1900 may include performing a plurality of RRM measurements for the downlink carriers. In some examples, performing the plurality of RRM measurements may include measuring a number of reference signals (e.g., CRSs or DRSs) received on the downlink carriers. The number of reference signals may be associated with a fixed total transmit power across a plurality of time intervals. In some examples, the RRM measurements may include at least one of RSRP measurements, RSRQ measurements, RSSI measurements, or a combination thereof. The operation(s) at block 1910 may be performed using the wireless communication manager 720, 820, 920, 1020, 1120 or 1220 or UE wireless communication manager 1450 described with reference to FIG. 7, 8, 9, 10, 11, 12, or 14, or the RRM measurement manager 940 or 1040 described with reference to FIG. 9 or 10.

At block 1915, the method 1900 may include combining the RRM measurements over a time interval in the shared radio frequency spectrum band based at least in part on the received indication. In some examples (e.g., in the case of RSRP measurements or RSRQ measurements), the combining may include a summing. In some examples (e.g., in the case of RSSI measurements), the combining may include an averaging. The operation(s) at block 1915 may be performed using the wireless communication manager 720, 820, 920, 1020, 1120 or 1220 or UE wireless communication manager 1450 described with reference to FIG. 7, 8, 9, 10, 11, 12, or 14, or the RRM measurement combiner 945 or 1045 described with reference to FIG. 9 or 10.

At block 1920, the method 1900 may include transmitting a report based at least in part on the combined RRM measurements to a base station. The operation(s) at block 1920 may be performed using the wireless communication manager 720, 820, 920, 1020, 1120 or 1220 or UE wireless communication manager 1450 described with reference to FIG. 7, 8, 9, 10, 11, 12, or 14, or the RRM measurement report transmitter 950 or 1050 described with reference to FIG. 9 or 10.

At block 1925, the method 1900 may optionally include performing radio resource management based at least in part on the combined RRM measurements. In some examples, performing radio resource management may include at least one of determining whether to remain associated with the base station, or identifying a candidate base station for association or handover. The operation(s) at block 1925 may be performed using the wireless communication manager 720, 820, 920, 1020, 1120 or 1220 or UE wireless communication manager 1450 described with reference to FIG. 7, 8, 9, 10, 11, 12, or 14, or the radio resource manager 1055 described with reference to FIG. 10.

Thus, the method 1900 may provide for wireless communication. It should be noted that the method 1900 is just one implementation and that the operations of the method 1900 may be rearranged or otherwise modified such that other implementations are possible.

Figure 20:
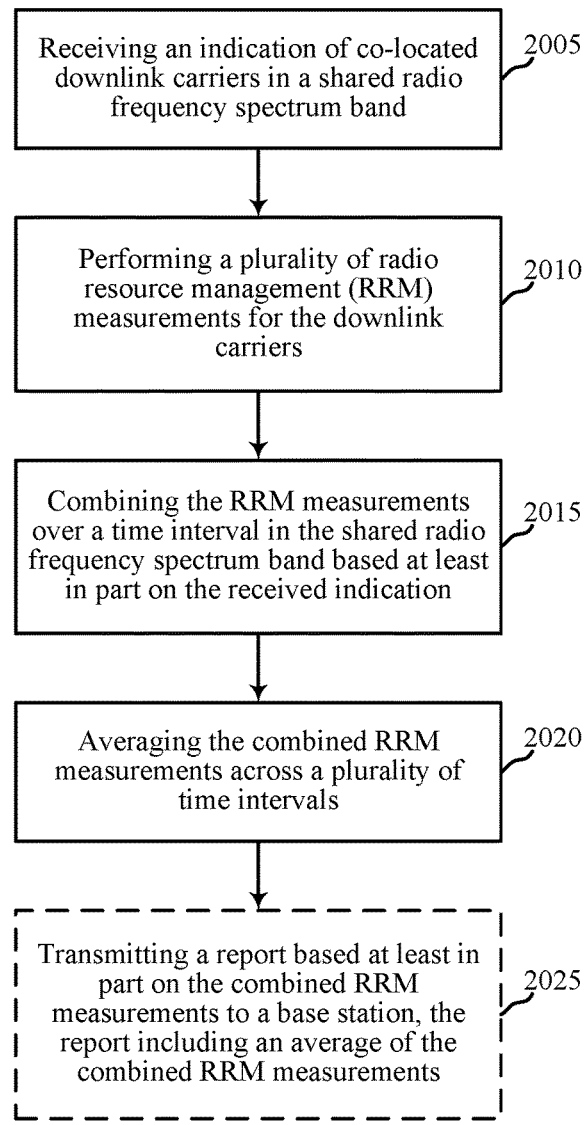
FIG. 20 is a flow chart illustrating an example of a method for wireless communication at a UE, in accordance with various aspects of the present disclosure.

FIG. 20 is a flow chart illustrating an example of a method 2000 for wireless communication at a UE, in accordance with various aspects of the present disclosure. For clarity, the method 2000 is described below with reference to aspects of one or more of the UEs 115, 215, 215-a, 215-b, 215-c, 315, 415, 515, 615, or 1415 described with reference to FIG. 1, 2, 3, 4, 5, 6, or 14, or aspects of one or more of the apparatuses 715, 815, 915, 1015, 1115, or 1215 described with reference to FIG. 7, 8, 9, 10, 11, or 12. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include receiving an indication of co-located downlink carriers in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 2005 may be performed using the wireless communication manager 720, 820, 920, 1020, 1120 or 1220 or UE wireless communication manager 1450 described with reference to FIG. 7, 8, 9, 10, 11, 12, or 14, or the co-located downlink carrier identifier 935 or 1035 described with reference to FIG. 9 or 10.

At block 2010, the method 2000 may include performing a plurality of RRM measurements for the downlink carriers. In some examples, performing the plurality of RRM measurements may include measuring a number of reference signals (e.g., CRSs or DRSs) received on the downlink carriers. The number of reference signals may be associated with a fixed total transmit power across a plurality of time intervals. In some examples, the RRM measurements may include at least one of RSRP measurements, RSRQ measurements, RSSI measurements, or a combination thereof. The operation(s) at block 2010 may be performed using the wireless communication manager 720, 820, 920, 1020, 1120 or 1220 or UE wireless communication manager 1450 described with reference to FIG. 7, 8, 9, 10, 11, 12, or 14, or the RRM measurement manager 940 or 1040 described with reference to FIG. 9 or 10.

At block 2015, the method 2000 may include combining the RRM measurements over a time interval in the shared radio frequency spectrum band based at least in part on the received indication. In some examples (e.g., in the case of RSRP measurements or RSRQ measurements), the combining may include a summing. In some examples (e.g., in the case of RSSI measurements), the combining may include an averaging. The operation(s) at block 2015 may be performed using the wireless communication manager 720, 820, 920, 1020, 1120 or 1220 or UE wireless communication manager 1450 described with reference to FIG. 7, 8, 9, 10, 11, 12, or 14, or the RRM measurement combiner 945 or 1045 described with reference to FIG. 9 or 10.

At block 2020, the method 2000 may include averaging the combined RRM measurements across a plurality of time intervals. The operation(s) at block 2020 may be performed using the wireless communication manager 720, 820, 920, 1020, 1120 or 1220 or UE wireless communication manager 1450 described with reference to FIG. 7, 8, 9, 10, 11, 12, or 14, or the RRM measurement combiner 945 or 1045 described with reference to FIG. 9 or 10.

At block 2025, the method 2000 may include transmitting a report based at least in part on the combined RRM measurements to a base station. The report may include an average of the combined RRM measurements. The operation(s) at block 2025 may be performed using the wireless communication manager 720, 820, 920, 1020, 1120 or 1220 or UE wireless communication manager 1450 described with reference to FIG. 7, 8, 9, 10, 11, 12, or 14, or the RRM measurement report transmitter 950 or 1050 described with reference to FIG. 9 or 10.

Thus, the method 2000 may provide for wireless communication. It should be noted that the method 2000 is just one implementation and that the operations of the method 2000 may be rearranged or otherwise modified such that other implementations are possible.

Figure 21:
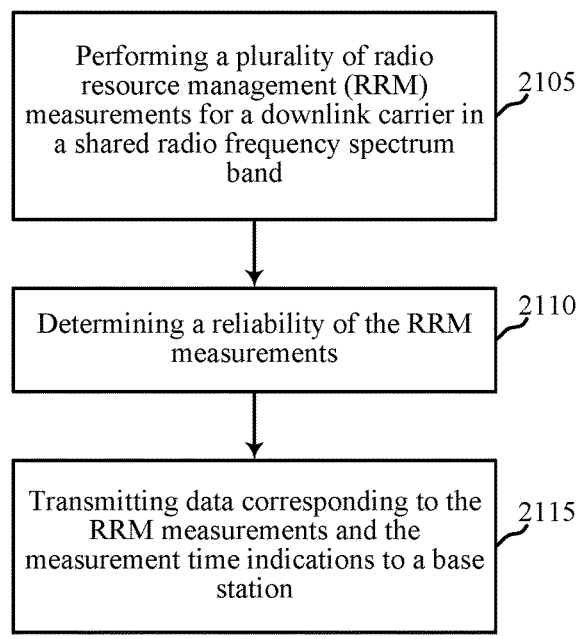
FIG. 21 is a flow chart illustrating an example of a method for wireless communication at a UE, in accordance with various aspects of the present disclosure.

FIG. 21 is a flow chart illustrating an example of a method 2100 for wireless communication at a UE, in accordance with various aspects of the present disclosure. For clarity, the method 2100 is described below with reference to aspects of one or more of the UEs 115, 215, 215-a, 215-b, 215-c, 315, 415, 515, 615, or 1415 described with reference to FIG. 1, 2, 3, 4, 5, 6, or 14, or aspects of one or more of the apparatuses 715, 815, 915, 1015, 1115, or 1215 described with reference to FIG. 7, 8, 9, 10, 11, or 12. In some examples, a UE may execute one or more sets of codes to control the functional elements of the UE to perform the functions described below. Additionally or alternatively, the UE may perform one or more of the functions described below using special-purpose hardware.

At block 2105, the method 2100 may include performing a plurality of RRM measurements for a downlink carrier in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). In some examples, a RRM measurement may be performed when the downlink carrier is active (e.g., during a LBT radio frame or LBT transmission burst for which contention for access to the shared radio frequency spectrum band has been won), but not when the downlink carrier is inactive (e.g., during a LBT radio frame or LBT transmission burst for which contention for access to the shared radio frequency spectrum band has been lost). In some examples, performing the plurality of RRM measurements may include measuring a plurality of reference signals (e.g., CRSs or DRSs) received on the downlink carrier. The operation(s) at block 2105 may be performed using the wireless communication manager 720, 820, 920, 1020, 1120 or 1220 or UE wireless communication manager 1450 described with reference to FIG. 7, 8, 9, 10, 11, 12, or 14, or the RRM measurement manager 1135 described with reference to FIG. 11.

At block 2110, the method 2100 may include determining a reliability of the RRM measurements. In some examples, determining the reliability of the RRM measurements may include identifying an elapsed time without performing a valid RRM measurement. In some examples, determining the reliability of the RRM measurements may include counting a number of the RRM measurements performed during a period of time. The operation(s) at block 2110 may be performed using the wireless communication manager 720, 820, 920, 1020, 1120 or 1220 or UE wireless communication manager 1450 described with reference to FIG. 7, 8, 9, 10, 11, 12, or 14, or the RRM measurement reliability indicator 1140 described with reference to FIG. 11.

At block 2115, the method 2100 may include transmitting data corresponding to the RRM measurements and an indication of the reliability of the RRM measurements to a base station. The operation(s) at block 2115 may be performed using the wireless communication manager 720, 820, 920, 1020, 1120 or 1220 or UE wireless communication manager 1450 described with reference to FIG. 7, 8, 9, 10, 11, 12, or 14, or the RRM measurement transmission manager 1145 described with reference to FIG. 11.

Thus, the method 2100 may provide for wireless communication. It should be noted that the method 2100 is just one implementation and that the operations of the method 2100 may be rearranged or otherwise modified such that other implementations are possible.

Figure 22:
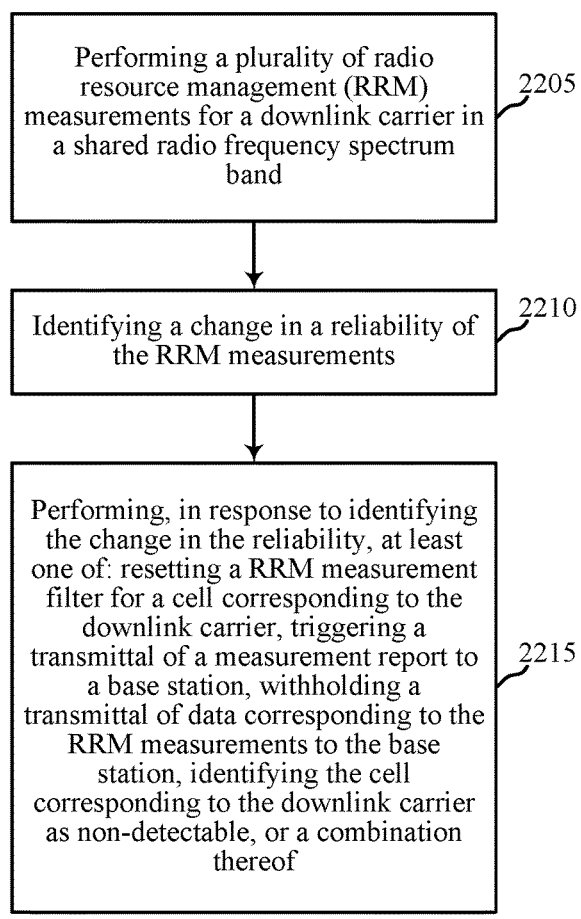
FIG. 22 is a flow chart illustrating an example of a method for wireless communication at a UE, in accordance with various aspects of the present disclosure.

FIG. 22 is a flow chart illustrating an example of a method 2200 for wireless communication at a UE, in accordance with various aspects of the present disclosure. For clarity, the method 2200 is described below with reference to aspects of one or more of the UEs 115, 215, 215-a, 215-b, 215-c, 315, 415, 515, 615, or 1415 described with reference to FIG. 1, 2, 3, 4, 5, 6, or 14, or aspects of one or more of the apparatuses 715, 815, 915, 1015, 1115, or 1215 described with reference to FIG. 7, 8, 9, 10, 11, or 12. In some examples, a UE may execute one or more sets of codes to control the functional elements of the UE to perform the functions described below. Additionally or alternatively, the UE may perform one or more of the functions described below using special-purpose hardware.

At block 2205, the method 2200 may include performing a plurality of RRM measurements for a downlink carrier in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). In some examples, a RRM measurement may be performed when the downlink carrier is active (e.g., during a LBT radio frame or LBT transmission burst for which contention for access to the shared radio frequency spectrum band has been won), but not when the downlink carrier is inactive (e.g., during a LBT radio frame or LBT transmission burst for which contention for access to the shared radio frequency spectrum band has been lost). In some examples, performing the plurality of RRM measurements may include measuring a plurality of reference signals (e.g., CRSs or DRSs) received on the downlink carrier. The operation(s) at block 2205 may be performed using the wireless communication manager 720, 820, 920, 1020, 1120 or 1220 or UE wireless communication manager 1450 described with reference to FIG. 7, 8, 9, 10, 11, 12, or 14, or the RRM measurement manager 1235 described with reference to FIG. 12.

At block 2210, the method 2200 may include identifying a change in a reliability of the RRM measurements. In some examples identifying a change in the reliability of the RRM measurements may include identifying a change in an elapsed time without performing a valid RRM measurement. In some examples, identifying a change in the reliability of the RRM measurements may include identifying a change in a number of RRM measurements performed during a period of time. The operation(s) at block 2210 may be performed using the wireless communication manager 720, 820, 920, 1020, 1120 or 1220 or UE wireless communication manager 1450 described with reference to FIG. 7, 8, 9, 10, 11, 12, or 14, or the RRM measurement reliability change indicator 1240 described with reference to FIG. 12.

At block 2215, the method 2200 may include performing, in response to identifying the change in the reliability, at least one of: resetting a RRM measurement filter for a cell corresponding to the downlink carrier, triggering a transmittal of a measurement report to a base station, withholding a transmittal of data corresponding to the RRM measurements to the base station, identifying a cell corresponding to the downlink carrier as non-detectable, or a combination thereof. The operation(s) at block 2215 may be performed using the wireless communication manager 720, 820, 920, 1020, 1120 or 1220 or UE wireless communication manager 1450 described with reference to FIG. 7, 8, 9, 10, 11, 12, or 14, or the RRM measurement filter manager 1245, RRM measurement transmission manager 1250, or the cell manager 1255 described with reference to FIG. 12.

Thus, the method 2200 may provide for wireless communication. It should be noted that the method 2200 is just one implementation and that the operations of the method 2200 may be rearranged or otherwise modified such that other implementations are possible.

In some examples, aspects of the method 1600, 1700, 1800, 1900, 2000, 2100, or 2200 described with reference to FIG. 16, 17, 18, 19, 20, 21, or 22 may be combined.

Figure 23:
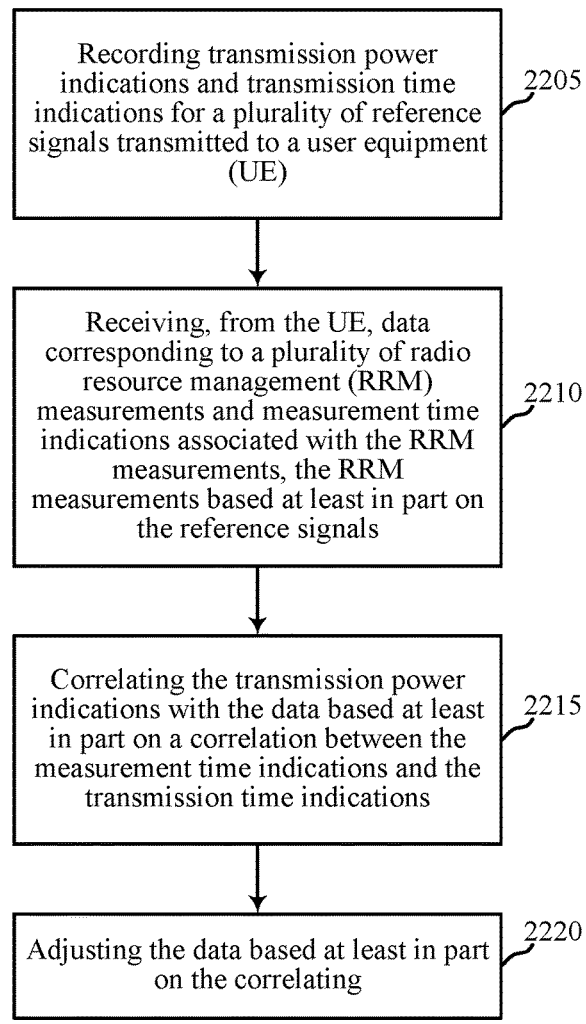
FIG. 23 is a flow chart illustrating an example of a method for wireless communication at a base station, in accordance with various aspects of the present disclosure.

FIG. 23 is a flow chart illustrating an example of a method 2300 for wireless communication at a base station, in accordance with various aspects of the present disclosure. For clarity, the method 2300 is described below with reference to aspects of one or more of the base stations 105, 205, 205-a, 305, 405, 505, 605, or 1505 described with reference to FIG. 1, 2, 3, 4, 5, 6, or 15, or aspects of the apparatus 1305 described with reference to FIG. 13. In some examples, a base station may execute one or more sets of codes to control the functional elements of the base station to perform the functions described below. Additionally or alternatively, the base station may perform one or more of the functions described below using special-purpose hardware.

At block 2305, the method 2300 may include recording transmission power indications and transmission time indications for a plurality of reference signals (e.g., CRSs or DRSs) transmitted to a UE. In some examples, the operation(s) at block 2305 may further include recording first carrier indications for the plurality of reference signals. In some examples, the reference signals may be transmitted on a number of active downlink carriers in a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). In some examples, the active downlink carriers may include a set of one or more carriers for which contention for access to the shared radio frequency spectrum band has been won. The operation(s) at block 2305 may be performed using the wireless communication manager 1320 or base station wireless communication manager 1560 described with reference to FIG. 13 or 15, or the reference signal transmitter 1335 described with reference to FIG. 13.

At block 2310, the method 2300 may include receiving, from the UE, data corresponding to a plurality of RRM measurements, measurement time indications associated with the RRM measurements, and optionally second carrier indications associated with the RRM measurements. The RRM measurements may be based at least in part on the reference signals. The operation(s) at block 2310 may be performed using the wireless communication manager 1320 or base station wireless communication manager 1560 described with reference to FIG. 13 or 15, or the RRM measurement receiver 1340 described with reference to FIG. 13.

At block 2315, the method 2300 may include correlating the transmission power indications with the data based at least in part on a correlation between the measurement time indications and the transmission time indications (and optionally, based on a correlation of the second carrier indications with the first carrier indications). The operation(s) at block 2315 may be performed using the wireless communication manager 1320 or base station wireless communication manager 1560 described with reference to FIG. 13 or 15, or the transmission power correlator 1345 described with reference to FIG. 13.

At block 2320, the method 2300 may optionally include identifying, from the correlating, at least one reference signal for which data corresponding to a RRM measurement is not received. The operation(s) at block 2320 may be performed using the wireless communication manager 1320 or base station wireless communication manager 1560 described with reference to FIG. 13 or 15, or the RRM data analyzer 1350 described with reference to FIG. 13.

At block 2325, the method 2300 may optionally include identifying, from the correlating, data corresponding to at least one outlier RRM measurement. The operation(s) at block 2325 may be performed using the wireless communication manager 1320 or base station wireless communication manager 1560 described with reference to FIG. 13 or 15, or the RRM data analyzer 1350 described with reference to FIG. 13.

At block 2330, the method 2300 may include adjusting the data (received at block 2310) based at least in part on the correlating (performed at block 2315). The operation(s) at block 2330 may be performed using the wireless communication manager 1320 or base station wireless communication manager 1560 described with reference to FIG. 13 or 15, or the RRM data adjuster 1355 described with reference to FIG. 13.

Thus, the method 2300 may provide for wireless communication. It should be noted that the method 2300 is just one implementation and that the operations of the method 2300 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
    performing a plurality of radio resource management (RRM) measurements for a number of active downlink carriers in a shared radio frequency spectrum band, wherein an active downlink carrier is associated with a successful listen before talk (LBT) procedure performed by a base station, and wherein performing the plurality of RRM measurements comprises measuring a plurality of reference signals received on the number of active downlink carriers, the plurality of reference signals associated with variable transmit powers across a plurality of time intervals;
    associating each of the RRM measurements with a measurement time indication corresponding to one of the plurality of time intervals, each of the measurement time indications for adjusting a value of a corresponding one of the RRM measurements based at least in part on the variable transmit powers across the plurality of time intervals of the plurality of reference signals; and
    transmitting, to the base station, a report comprising a combination of the plurality of RRM measurements and the measurement time indications associated with each of the RRM measurements.

2. The method of claim 1, further comprising:
    associating each of the RRM measurements with a carrier indication; and
    transmitting to the base station, with the report comprising the combination of the RRM measurements and the measurement time indications, the carrier indications.

3. The method of claim 1, wherein associating each of the RRM measurements with the measurement time indications comprises:
    associating at least one of the RRM measurements with a subframe number corresponding to a subframe in which the respective RRM measurement is performed.

4. The method of claim 1, wherein associating each of the RRM measurements with the measurement time indications comprises:
    associating one or more of the RRM measurements with a measurement order.

5. The method of claim 1, wherein the RRM measurements are performed and associated with the measurement time indications at a physical layer of a protocol stack, wherein the report comprising the combination of the RRM measurements and the measurement time indications comprises unfiltered and non-averaged values transmitted from the physical layer to the base station.

6. The method of claim 5, wherein transmitting the report comprising the combination of the RRM measurements and the measurement time indications comprises:
    reporting the report comprising the combination of the RRM measurements and the measurement time indications from the physical layer to a layer of the protocol stack higher than the physical layer; and
    reporting the report comprising the combination of the RRM measurements and the measurement time indications from the layer of the protocol stack higher than the physical layer to the base station.

7. An apparatus for wireless communication at a user equipment (UE), comprising:
    a processor; and
    memory coupled to the processor, wherein the processor is configured to:
        perform a plurality of radio resource management (RRM) measurements for a number of active downlink carriers in a shared radio frequency spectrum band, wherein an active downlink carrier is associated with a successful listen before talk (LBT) procedure performed by a base station, and wherein performing the plurality of RRM measurements comprises measuring a plurality of reference signals received on the number of active downlink carriers, the plurality of reference signals associated with variable transmit powers across a plurality of time intervals;
        associate each of the RRM measurements with a measurement time indication corresponding to one of the plurality of time intervals, each of the measurement time indications for adjusting a value of a corresponding one of the RRM measurements based at least in part on the variable transmit powers across the plurality of time intervals of the plurality of reference signals; and
        transmit, to the base station, a report comprising a combination of the plurality of RRM measurements and the measurement time indications associated with each of the RRM measurements.

8. The apparatus of claim 7, wherein the processor is configured to:

associate each of the RRM measurements with a carrier indication; and transmit to the base station, with the report comprising the combination of the RRM measurements and the measurement time indications, the carrier indications.

9. The apparatus of claim 7, wherein
the processor configured to associate each of the RRM measurements with the measurement time indications is further configured to associate at least one of the RRM measurements with a subframe number corresponding to a subframe in which the respective RRM measurement is performed.

10. The apparatus of claim 7, wherein
the processor configured to associate each of the RRM measurements with the measurement time indications is further configured to associate one or more of the RRM measurements with a measurement order.

11. The apparatus of claim 7, wherein the RRM measurements are performed and associated with the measurement time indications at a physical layer of a protocol stack, wherein the report comprising the combination of the RRM measurements and the measurement time indications comprises unfiltered and non-averaged values transmitted from the physical layer to the base station.

12. The apparatus of claim 11, wherein the processor configured to transmit the report comprising the combination of the RRM measurements and the measurement time indications is further configured to:

report the report comprising the combination of the RRM measurements and the measurement time indications from the physical layer to a layer of the protocol stack higher than the physical layer; and report the report comprising the combination of the RRM measurements and the measurement time indications from the layer of the protocol stack higher than the physical layer to the base station.

13. A method for wireless communication at a user equipment (UE), comprising:

receiving an indication of co-located downlink carriers in a shared radio frequency spectrum band, wherein each of the co-located downlink carriers is associated with a different cell identifier, the co-located downlink carriers sharing a total transmit power constraint;

identifying, based at least in part on the indication of the co-located downlink carriers, a subset of the co-located downlink carriers associated with a successful listen before talk (LBT) procedure performed by a base station;

performing a plurality of radio resource management (RRM) measurements for each of the co-located carriers of the subset of the co-located downlink carriers associated with the successful LBT procedure;

combining, for at least one RRM measurement of the plurality of RRM measurements, values for the at least one RRM measurement for the subset of the co-located downlink carriers over a time interval in the shared radio frequency spectrum band based at least in part on the received indication to obtain a combined value for the at least one RRM measurement for the subset of the co-located downlink carriers; and transmitting a report based at least in part on the combined value for the at least one RRM measurement to the base station.

14. The method of claim 13, wherein the combining comprises at least one of summing or averaging the at least one RRM measurement from each of the co-located carriers of the subset of the co-located downlink carriers over the time interval.

15. The method of claim 13, further comprising:
performing RRM based at least in part on the combined value for the at least one RRM measurement.

16. The method of claim 15, further comprising:
determining whether to remain associated with the base station, or identifying a candidate base station for association or handover.

17. The method of claim 13, wherein performing the plurality of RRM measurements comprises:
measuring a number of reference signals received on each of the co-located carriers of the subset of the co-located downlink carriers, the number of reference signals associated with the total transmit power constraint, the total transmit power constraint comprising a fixed total transmit power across a plurality of time intervals.

18. The method of claim 13, wherein the RRM measurements comprise at least one of:
reference signal receive power (RSRP) measurements, reference signal received quality (RSRQ) measurements, reference signal strength indicator (RSSI) measurements, or a combination thereof.

19. An apparatus for wireless communication at a user equipment (UE), comprising:
a processor; and
memory coupled to the processor, wherein the processor is configured to:
receive an indication of co-located downlink carriers in a shared radio frequency spectrum band, wherein each of the co-located downlink carriers is associated with a different cell identifier, the co-located downlink carriers sharing a total transmit power constraint;
identify, based at least in part on the indication of the co-located downlink carriers, a subset of the co-located downlink carriers associated with a successful listen before talk (LBT) procedure performed by a base station;
perform a plurality of radio resource management (RRM) measurements for each of the co-located carriers of the subset of the co-located downlink carriers associated with the successful LBT procedure;
combine, for at least one RRM measurement of the plurality of RRM measurements, values for the at least one RRM measurement for the subset of the co-located downlink carriers over a time interval in the shared radio frequency spectrum band based at least in part on the received indication to obtain a combined value for the at least one RRM measurements for the subset of the co-located downlink carriers; and
transmit a report based at least in part on the combined value for the at least one RRM measurement to the base station.

20. The apparatus of claim 19, wherein the processor configured to combine the values for the at least one RRM measurement is further configured to at least one of sum or average the at least one RRM measurement from each of the co-located carriers of the subset of the co-located downlink carriers over the time interval.

21. The apparatus of claim 19, wherein the processor is configured to:
perform RRM based at least in part on the combined value for the at least one RRM measurement.

22. The apparatus of claim 19, wherein the processor is further configured to:
   determine whether to remain associated with the base station, or identify a candidate base station for association or handover.

23. The apparatus of claim 19, wherein
   the processor configured to perform the plurality of RRM measurements is further configured to measure a number of reference signals received on each of the co-located carriers of the subset of the co-located downlink carriers, the number of reference signals associated with the total transmit power constraint, the total transmit power constraint comprising a fixed total transmit power across a plurality of time intervals.

24. The apparatus of claim 19, wherein the RRM measurements comprise at least one of:
   reference signal receive power (RSRP) measurements, reference signal received quality (RSRQ) measurements, reference signal strength indicator (RSSI) measurements, or a combination thereof.

* * * * *